(12) United States Patent
Lamm et al.

(10) Patent No.: US 12,185,038 B1
(45) Date of Patent: Dec. 31, 2024

(54) SYSTEM AND METHOD FOR CALL ROUTING BASED ON DIGITAL INTENSITY

(71) Applicant: UIPCO, LLC, San Antonio, TX (US)

(72) Inventors: Gregory Allen Lamm, Mesa, AZ (US); Ohn Gordon, San Antonio, TX (US); Sathish Kumar Srinivasan, San Antonio, TX (US); David Ricardo Martinez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 364 days.

(21) Appl. No.: 17/815,330

(22) Filed: Jul. 27, 2022

(51) Int. Cl.
*H04M 3/00* (2024.01)
*H04L 12/66* (2006.01)
*H04M 5/00* (2006.01)
*H04Q 3/66* (2006.01)

(52) U.S. Cl.
CPC ..................................... *H04Q 3/66* (2013.01)

(58) Field of Classification Search
CPC .... H04M 3/5233; H04M 3/5175; H04M 3/51; H04M 3/5191; H04M 3/523; H04M 3/42068; H04M 3/5183; H04M 2203/402; H04M 2203/404; H04M 3/5232; H04M 7/123; H04M 15/8061; H04M 2201/42; H04M 2203/551

USPC ............ 379/266.01, 265.09, 265.11, 265.12, 379/265.01, 309, 265.13; 370/352, 353

See application file for complete search history.

(56) References Cited

U.S. PATENT DOCUMENTS

| | | | | |
|---|---|---|---|---|
| 7,372,952 B1 * | 5/2008 | Wu | ...................... | H04M 3/5233 379/265.11 |
| 2016/0036981 A1 * | 2/2016 | Hollenberg | .......... | H04M 3/5233 379/265.12 |
| 2016/0036982 A1 * | 2/2016 | Ristock | ................... | G06Q 10/04 379/265.1 |

* cited by examiner

*Primary Examiner* — Kharye Pope
(74) *Attorney, Agent, or Firm* — Plumsea Law Group, LLC

(57) ABSTRACT

A system and method for call routing based on measuring and applying a digital intensity metric to interact with a user of a provider system is disclosed. Specifically, the embodiments provide systems and methods that allow users to place a voice call to the system. The system receives the voice call from a calling user. The system obtains transaction information and processes the transaction information to summarize the transaction information for the user. The system uses the processed information to calculate a digital intensity metric, and the user is classified as a rare user based on the digital intensity metric. The user is then routed to a special member service representative, user information is provided to the member service representative, consent documents are provided to the user, and executed consent documents are received from the user.

20 Claims, 12 Drawing Sheets

| Member | Feb-2020 | Mar-2020 | Apr-2020 | May-2020 | Jun-2020 | Jul-2020 | Aug-2020 | Sep-2020 | Oct-2020 | Nov-2020 | Dec-2020 | Jan-2021 | Total Digital Contacts | Total Contact Opportunities | Digital Intensity Rate |
|---|---|---|---|---|---|---|---|---|---|---|---|---|---|---|---|
| 1 | - | - | OMNI | OMNI | OMNI | PHN | PHN | PHN | PHN | PHN | PHN | OMNI | 0 | 10 | 0% |
| 2 | - | DIG | - | - | - | PHN | PHN | PHN | PHN | PHN | - | - | 1 | 6 | 17% |
| 3 | DIG | DIG | - | PHN | OMNI | PHN | PHN | PHN | PHN | PHN | PHN | PHN | 2 | 11 | 18% |
| 4 | DIG | DIG | OMNI | OMNI | OMNI | PHN | DIG | PHN | PHN | - | PHN | - | 2 | 9 | 22% |
| 5 | DIG | DIG | DIG | PHN | PHN | PHN | OMNI | PHN | PHN | PHN | PHN | - | 3 | 11 | 27% |
| 6 | DIG | DIG | DIG | DIG | DIG | DIG | OMNI | OMNI | PHN | PHN | PHN | PHN | 4 | 9 | 44% |
| 7 | DIG | DIG | DIG | OMNI | DIG | OMNI | DIG | OMNI | OMNI | OMNI | OMNI | - | 5 | 11 | 45% |
| 8 | PHN | DIG | PHN | DIG | DIG | DIG | DIG | OMNI | OMNI | OMNI | - | PHN | 6 | 9 | 67% |
| 9 | - | DIG | DIG | DIG | DIG | DIG | DIG | DIG | DIG | DIG | - | - | 7 | 10 | 70% |
| 10 | - | - | DIG | DIG | DIG | DIG | DIG | DIG | DIG | DIG | DIG | PHN | 10 | 10 | 100% |
| | | | | | | | | | | | | TOTAL | 40 | 96 | 42% |

OMNI = BOTH PHN & DIG (REGIONS 5,6,7)
PHN = PHONE ONLY (REGION 3)
DIG = MOBILE/INTERNET ONLY (REGIONS 1,2,4)

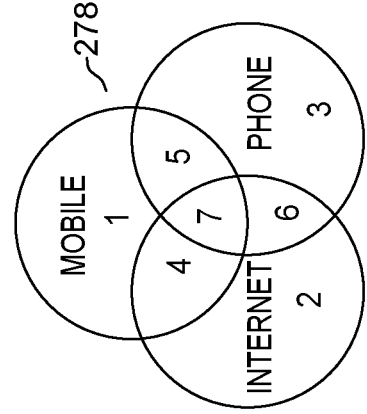

FIG. 2C

SYSTEM AND METHOD FOR CALL ROUTING BASED ON DIGITAL INTENSITY

TECHNICAL FIELD

The present disclosure generally relates to systems and methods for call routing, and in particular to call routing based on measuring digital intensity associated with users of a system.

BACKGROUND

Digital adoption is a measure of what portion of interactions between a business and the users of the business occurs through digital channels. Such a metric is presently found by considering actions by users in the aggregate, rather than individually or in a personalized manner. Digital channels may include interactions through a website or a mobile app. Current methods for calculating digital adoption present difficulties for enterprise and business applications. Such current methods may be a digital adoption ratio based on a percent of members who interact with a given business through digital channels at least once within a given time period. Thus, the existing digital adoption ratio is limited in applicable use, since it is broadly a measure of the total number of members that interact with the business using such digital interactions, divided by the total number of members interacting with the business.

Such a method may generally explain how members use various channels. For example, the method may clarify how often phone support is used as compared to digital channels. However, it may be difficult to act on such a metric due to its general nature. Also, the current metric may be a lagging indicator of trends. Further, the denominator may include internal corporate activity as part of a total number of users. Considering such information may add noise to the calculation. Such a method also meaningfully fails to measure the user shift to digital channels which often is the focus of digital transformation projects that are often multi-year and cover a variety of user experiences that span digital and non-digital channels.

There is a need in the art for a system and method that addresses the shortcomings discussed above.

SUMMARY

In one aspect, a method of call routing based on measuring and applying a digital intensity metric is disclosed. The method includes a first step of receiving a voice call from a calling user. The method also includes a second step of accessing user transaction information for a plurality of users including the calling user. The method also includes a third step of processing the user transaction information to produce summarized transaction information for the calling user. The method also includes a fourth step of calculating a digital intensity metric for the calling user based on the summarized transaction information by calculating a quotient of exclusively digital opportunities and total opportunities. The method also includes a fifth step of classifying the calling user as a rare user based on the digital intensity metric. The method also includes a sixth step of routing the calling user to a special member service representative. The method also includes a seventh step of providing user account information for the calling user to the special member service representative. The method also includes an eighth step of providing consent documents to the calling user for execution. The method also includes a ninth step of receiving the executed consent documents from the calling user.

In another aspect, a method of call routing based on measuring and applying a digital intensity metric is disclosed. The method includes a first step of receiving a voice call from a calling user. The method also includes a second step of accessing user transaction information for a plurality of users including the calling user. The method also includes a third step of processing the user transaction information to produce summarized transaction information for the calling user. The method also includes a fourth step of calculating a digital intensity metric for the calling user based on the summarized transaction information. The method also includes a fifth step of classifying the calling user as a rare user based on the digital intensity metric. The method also includes a sixth step of routing the calling user to a special member service representative. The method also includes a seventh step of providing user account information for the calling user to the special member service representative. The method also includes an eighth step of providing consent documents including pending and upcoming consent documents to the calling user for execution. The method also includes a ninth step of receiving the executed consent documents from the calling user.

In another aspect, a system for call routing based on measuring and applying a digital intensity metric includes a processor and a non-transitory computer readable medium storing instructions that are executable by the processor. The instructions cause the processor to receive a voice call from a calling user. The instructions further cause the processor to access user transaction information for a plurality of users including the calling user. The instructions further cause the processor to process the user transaction information to produce summarized transaction information for the calling user. The instructions further cause the processor to calculate a digital intensity metric for the calling user based on the summarized transaction information. The instructions further cause the processor to classify the calling user as a rare user based on the digital intensity metric. The instructions further cause the processor to modify a call queue based on the user classification. The instructions further cause the processor to route the calling user to a special member service representative. The instructions further cause the processor to provide user account information for the calling user to the special member service representative. The instructions further cause the processor to provide consent documents to the calling user for execution. The instructions further cause the processor to receive the executed consent documents from the calling user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the inven

FIG. 2C illustrates a table of activity by users over the course of a year, and shows aspects of calculating digital intensity based on the table, according to an embodiment;

DESCRIPTION OF EMBODIMENTS

Figure 1:
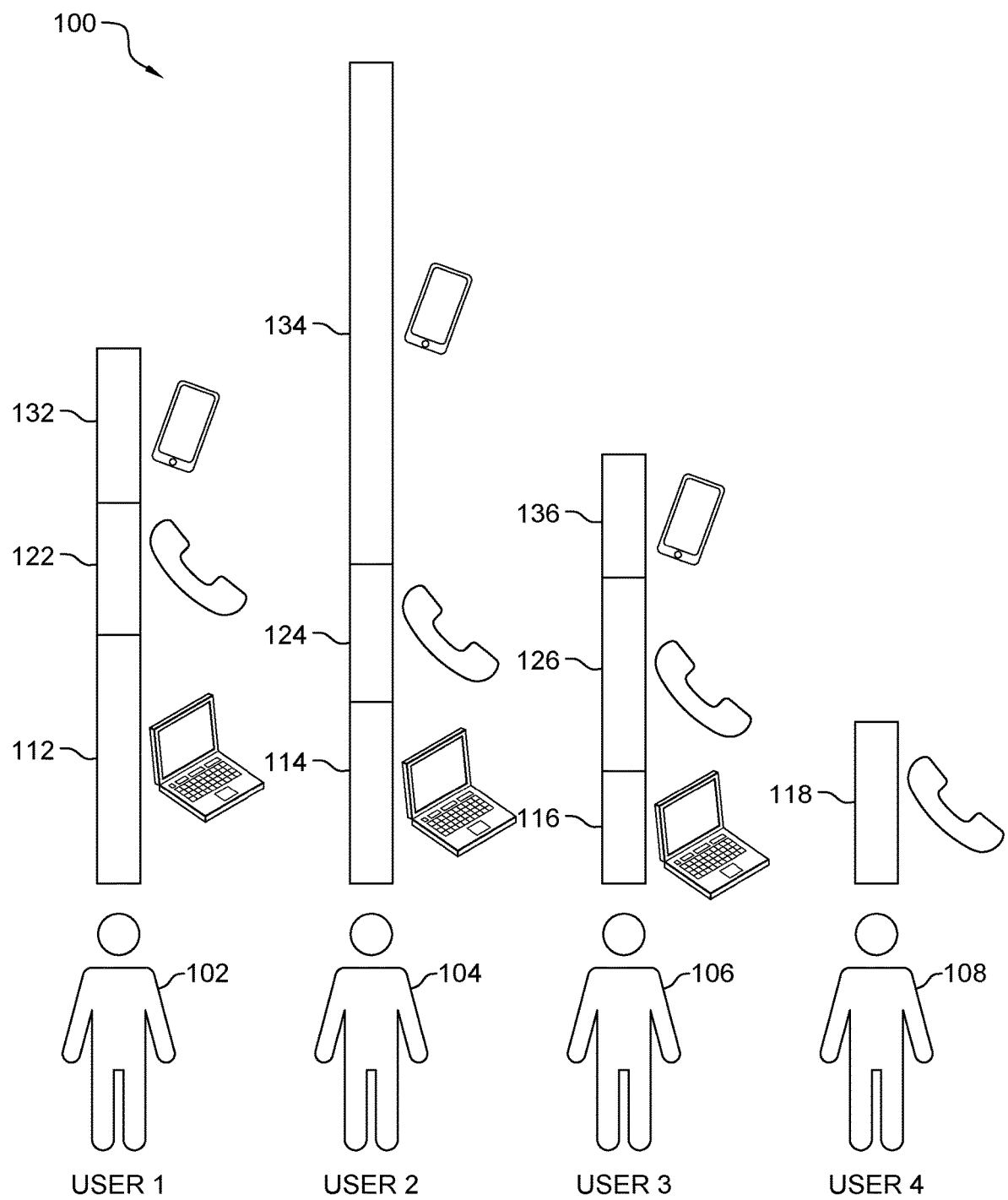
- FIG. 1 illustrates a schematic view of relative measures of digital intensity for users in a system, according to an embodiment.

The embodiments provide systems and methods for call routing based on digital intensity, providing a more precise and customized form of digital adoption. Digital intensity or digital adoption each refer to a metric of how often users interact with a business system using digital channels. Digital channels may include a mobile app or a website. Other channels may include alternative channels, such as phone interactions. Such a business system may be referred to throughout the disclosure as a "system." Additional details of such a system may be found throughout the disclosure. A specific embodiment of such a system is discussed in detail in the discussion of digital intensity measurement system 910 in FIG. 9. Digital adoption is also used herein generally to refer to the process of how users may shift from performing non-digital interactions to digital interactions.

In general, digital interactions are helpful for a business in that it may be easier to create digital infrastructure rather than to pay for a human representative. Considering digital intensity measurement informs a business's technology strategy, influences future digital tactics to help the membership, and reduces enterprise costs and prioritization of resources. Accordingly, considering digital intensity may be a useful consideration.

Digital intensity calculation involves a series of steps to transform the data into a unique and personalized ratio for each individual. First, normalized tables within an enterprise data warehouse logging sessions and contacts by channel are extracted into a temporary table. The data represent many possible interactions per member, associated with each individual's channel interaction data. The channel interaction data is considered only if and when it occurs. The data is then grouped and characterized to transform the individual member's channel contacts into a monthly snapshot. Such data was previously vertically structured by the multiple contacts across multiple channels. The data is now transposed to a distinct individual view with summary channel interactions for that individual on a single record. Given the three main channels of Mobile, Internet, and Telephone, a Venn diagram can represent the seven distinct regions that any individual can reside in, based on their unique combination of channels used. An eighth space is represented outside the Venn region for those individuals who had no contact interaction (Silent).

Methods then characterize the monthly member behavior by channel categories (no contact, only digital, only phone, or omni, where omni refers to a combination of categories). This method is repeated to build a monthly perspective of a rolling 12-month window to incorporate seasonality and patterns of behavior for each individual member. Completing a full 12-months of rolling data allows the methods to calculate the total contact opportunities that each individual exhibited. Lastly, methods calculate the number of those opportunities which were exclusively digital, with the quotient result as that individual's digital intensity.

Digital intensity calculation may also provide opportunities for call mitigation. Call mitigation includes timely digital interventions for to either shift to digital channels or start using digital channels. For example, a digital intensity calculation may establish that a user uses digital channels to some degree, but may have opportunities to use digital channels further. Alternatively, the digital intensity calculation may establish that a user has not used digital channels in the past. In either case, call mitigation techniques help shift users towards digital transactions. For example, users with digital intensity scores indicating that there is an opportunity may be contacted through channels such as e-mails, text messages, and web ads to encourage adoption of digital channels.

Improving and refining the digital intensity measurement may provide several advantages. Such advantages may include helping to inform technology strategy for a business, influencing future digital tactics to help the membership of the business, reducing enterprise costs, and helping to prioritize resources for the business. Because of these and other advantages, it would be quite valuable to improve digital intensity measurement. Such improvements could improve overall efficacy of resource allocation for a business. Such improvements could also allow for improvements of individual interactions between a business and a user of the business. Improving the metric could aid in routing users to member service representatives more effectively.

Digital intensity may track user interactions for a given time range, establish which of the interactions are exclusively digital, and which of the interactions involve phone interactions with a representative. Embodiments provide systems and methods that allow embodiments to measure digital intensity based on analyzing user data. Such data analysis establishes digital intensity for a given user.

Embodiments may offer the ability to accelerate measurements of digital intensity, as well as corresponding ability to act. Projects often span multiple years and may include a variety of user interactions including digital and non-digital interactions. By contrast, embodiments are able to quickly gather and process sufficient information to measure digital intensity for individual users and establish characteristics of user behavior over a 12-month period. Such measurements rapidly assess characteristics of differences between digital and non-digital interactions, as well as seasonal patterns in user behaviors. Further details of how such expedited measurements occurs are discussed in particular in the detailed description of FIGS. 2A-2D, below.

Embodiments may then use the measured digital intensity to better serve a user of a business system. Certain actions may be taken when a user contacts the business system using a type of interaction. Some embodiments of the business system can include provisions that permit actions based on using the measured digital intensity to better serve the user. The personalized measured digital intensity metric may take the form of a score. In some cases, the system may take particular action if the digital intensity score is unusually high. In other cases, the system may take particular action if the digital intensity score is unusually low.

In some embodiments where measured digital intensity is low, suitable actions and methods may be used to encourage a user to increase a low digital intensity to a higher digital intensity. These actions and methods may include incentives and offers. Also, in some cases where measured digital intensity is low, suitable actions and methods may be used to encourage a user to maximize the utility of voice calls placed by such a user. These actions and methods may include facilitating particular interactions between the user and a service representative. In some embodiments, the service representative may receive particular information about the user. In some embodiments, the service representative may interact with the user in particular ways. In some cases, such particular ways may include gathering consent information for the user. The consent information may include pending and anticipated consents. In some embodiments, the representative may guide the user through approving such consents.

In some embodiments, a call queue may be re-ordered based on digital intensity. In some embodiments, there may be provisions to handle voice call from users with low digital intensity by modifying call intensity. These provisions may include ways of advancing a voice call from a user with a low digital intensity in a telephonic queue. The system may re-order the call queue such that a voice call from a rare user is answered after a set number of minutes. The system may also move the call from the rare user to the top of a queue. Alternatively, the system may move the call from the rare user to a special queue used to manage calls for rare users. Thus, the system may take various steps to prioritize call from a user with a low digital intensity score to increase a digital intensity. Rare users may have limited patience, so it may be helpful to ensure that representatives are available quickly to avoid having rare users terminate their voice calls due to a delay in access to a representative.

Such re-ordering may also encourage the user to maximize the utility of rare voice calls placed by such a user. In some embodiments, where re-ordering is used, the user with a low digital intensity has earlier access to a representative. As discussed, in some embodiments, users with a low digital intensity are granted highest priority for access to a representative. That representative may also have special training, as discussed further below.

In some embodiments, the users with the low digital intensity may be treated differently by a representative. In some embodiments, the representative may receive additional user information to support the special treatment. In some embodiments, the additional user information may include information about digital intensity and usage frequency for the user. Such received information may include patterns that allow the representative to encourage the user to interact more frequently and use digital means. In some cases, such patterns may include indications of incentives that were helpful for increasing digital intensity for the current user or for similar users in the past.

In some embodiments, the representative may use incentives to increase digital intensity and usage frequency. In some embodiments, the incentives may be financial incentives. In some cases, such financial incentives include a waived or a discounted fee for a transaction, or some sort of bonus offer or reward. In some embodiments, the incentives may include other options not available to all users. In some cases, such options may be offers for particular transactions or products that are only made available during digital interactions. The incentives may be used to increase digital intensity, to increase usage frequency, or both.

In some cases, certain actions may be conducted if the measured digital intensity is high. In some of those instances where measured digital intensity is high, suitable actions and methods may be used to encourage a user to maintain a high digital intensity. In some embodiments, a user with a high digital intensity may receive incentives based on a high digital intensity. The incentives may be financial incentives or other options not available to all users. The incentives may reward behavior where such a user uses a digital interaction. These incentives may differ from those of incentives used with a low digital intensity. These incentives may encourage users to continue their current behavior rather than change their behavior.

In other instances where the measured digital intensity is high, actions may be taken that rely on a high digital intensity to indicate that the user may have greater patience or may have greater tolerance for delay. In some cases, these actions may be the opposite of actions taken with respect to low digital intensity users. In these other instances, suitable actions and methods may be used to prioritize users with lower digital intensity. Thus, in such embodiments, the user with the high digital intensity may have lower priority when they place a voice call to accommodate a user with a lower digital intensity. However, in other embodiments, other actions based on using the measured digital intensity score may be used.

The special representative may also provide the rare user with an incentive to interact with the business more frequently. In some cases, an inducement such as ones discussed in the above examples may apply to another transaction if it occurs within a certain time period. Such an inducement may gradually sunset as time elapses. In some cases, a certain bonus offer may be available if the user logs on again in the next three months, a lesser bonus may be available if the user logs on in the next six months, and no bonus may be available if the user logs on after six months. In addition, in some cases there may be interaction between the timing and type of interaction. A bonus offer may be available for only three months for a phone interaction, but for six months for a digital interaction.

Generally, the embodiments may provide an improved way to measure digital intensity. The embodiments use a personalized metric. Such a personalized metric may be calculated for each member that contacts the business via the big three channels. These big three channels are mobile app, Internet (Web) and phone (voice). Of these three channels, mobile app and Web interactions are considered to be digital interactions. Phone or voice interactions are considered separately. It may be possible for members to use other forms of interaction to carry out their business interactions, some of which are digital and some of which are not digital.

In some cases, digital interactions may include social media, or a dedicated desktop application used to interact with the provider. In other cases, members may use channels such as postal mail or fax machines. These interactions may also be considered to be non-digital interactions.

The distinction between digital and non-digital interactions may be of import to the business because mobile and Internet interactions can generally be handled automatically. A properly configured mobile application or website can automatically handle most requests by a user. Such a mobile application or website can provide a user with basic account information, answer questions, allow transactions and receive monetary payments, and allow the user to consent to various consents automatically. A non-digital interaction, such as a voice call, involves significant time and attention by a human being to allow such tasks. While some automation may be possible, it may still be more relevant to involve a human being in a voice interaction than in a digital interaction.

In the following disclosure, a voice call refers to an interaction between a user and a representative that involves an interaction in real-time or near real-time over an audio channel. For example, such a voice call may be a phone call conducted over a landline, which may use the public switched phone network (PSTN). A voice call may also be conducted over a wireless network, such as a 3G, 4G, or 5G cellular network. A voice call may also be conducted over a private network such as a private branch exchange (PBX) network or over an Integrated Services Digital Network (ISDN). A voice call may also be conducted using a Voice over Internet Protocol (VoIP) connection. A voice call may also be made using audio capabilities of a teleconferencing application, such as on a smart phone, a mobile device, a tablet computer, a laptop computer, or a desktop computer. Certain voice calls are referred to throughout this disclosure as phone calls as illustrative examples. Such phone calls may also include the alternative types of voice calls discussed here.

Measuring digital intensity may be quite helpful to find ways to increase digital intensity and maximize the utility of potentially rare voice calls. A personalized digital intensity metric can be assigned to each individual member. Current digital intensity metrics are limited to aggregate measures. Using such an individualized digital intensity metric, the individual data can also be aggregated and analyzed by market segment. Such consideration may help an enterprise prioritize tactics and strategies to engage lower digital intensity members.

The improved definition of "digital intensity" may be calculated according to the following exemplary method. Such a method may be detailed further with respect to FIGS. 2A-2D. For each member, the number of months where digital (such as mobile app and Internet and Web platform) contacts were exclusively used may be tabulated. Such a number may then be divided by the number of months any contact occurred (digital or phone). Such a quotient may provide basic information for a given member and is a central aspect of approaches used by embodiments to measure digital intensity. However, FIGS. 2A-2D show additional steps for gathering, transforming, and analyzing user data that further improve the digital intensity metric.

Such an improved measure may eliminate or reduce the noise of background changes in populations that the current digital intensity or digital adoption measurements contain. The improved personalized metric may also be more actionable. The digital intensity metric calculated by individual can be used to facilitate achieving several goals. First, the metric may facilitate initial adoption if a user has zero or no digital intensity. Second, the method may facilitate greater usage, such that the user may move up the scale of intensity, if the intensity may be low or a way to encourage intensity may be apparent. Third, the method may lead to efficiency gains and cost reductions. As noted, digital interactions may be cheaper than non-digital interactions and measuring digital intensity may help identify ways to encourage digital interactions. Fourth, the method may highlight opportunities with members where their intensity may be high but the members may struggle on some experiences. Such information may help identify ways to improve interactions that are already digital, but where the interactions could improve. Fifth, the method may take advantage of the power of segmentation at any member level. As discussed, the metrics may be aggregated to consider how best to serve groups of members as well as individual members.

Long-term, the digital intensity metric can be converted to a personalized attribute to assist member service representatives, hereinafter referred to simply as representatives. The digital intensity metric may help shape communication by representatives to the members on the phone to accelerate digital adoption for that each member. The digital intensity metric may be calculated at the member level. The digital intensity metric has the potential to also be calculated at the household level. Such calculation is similar to that of the member level, but may involve grouping and analyzing data for a household.

An additional strength of the approaches of embodiments not cited already may be the ability to attach demographic and operational data elements to the digital intensity metric. Such attached information may help a user of the metric to understand the digital adoption journey more fully at the member or member segment level. A user of the metric may then segment the membership based on transactions (e.g., claims, life events, growing family) that the members might be going through. By such segmenting, the metric may then provide even more information by showing patterns in how values of the metric relate to the segmentation criteria. One particular application of this new digital intensity score may be to assist with voice calls from members that very infrequently contact the business.

In some cases, the system may wish to find an average for such a digital intensity metric across all customers of a given type, such as active property and casualty insurance eligible members, or a segment of such members. These segments may involve segments such as age-based segments. Age-based segments may be particularly relevant because sometimes digital adoption may be more difficult for older users. Thus, older users may need the most support for digital transactions. Thus, in some cases such aggregation may focus on members over a cutoff age or age range, to include a certain eligible population. In some cases, the age ranges may correspond to life stages such as young adults, middle-aged adults, and senior citizens. In some cases, the age range may correspond to various generational cohorts, such as Generation Z, Millennials, Generation X, Baby Boomers, Greatest Generation, and so on. Particular age cutoffs for these age ranges and cohorts may be set as desired in various embodiments.

Some embodiments may include provisions for processing voice calls from users. In some embodiments, the voice calls may be processed based on a characteristic related to the user. In some embodiments, this characteristic may be related to the user's interactions with the business. In some cases, these interactions may be related to the form or method by which the user communicates with the system.

These forms of interaction can include voice calls, use of a mobile application, or use of a website over the Internet. In some cases, these various forms of interaction by a user may be used to establish a digital intensity score.

Some embodiments may include provisions for using a user's digital intensity score to process their incoming voice call. In some cases, the system make take action before the user is connected with a service representative. In some embodiments, voice calls from users with different associated digital intensity scores may be processed differently. In some embodiments, the system may establish categories based on the digital intensity score. In some cases, two or more categories may be established. In some embodiments, three categories may be used to classify users. Users with similar digital intensity scores may be placed in the same category. Users with sufficiently different digital intensity scores may be placed in different categories.

In those embodiments where three categories are used, the first category may group users that have a relatively high digital intensity score, meaning that these users are technically proficient and often interact with the system using the mobile application or Internet website. In some embodiments, users in the first category rarely if ever contact the company using a voice call. The second category may include users with an average digital intensity score. Finally, a third category may include users with a relatively low digital intensity score. These users rarely contact the company, and when they do, they generally prefer to use a voice call.

When a voice call is received, some embodiments may include provisions to identify the user. In some embodiments, the system may access information related to a device used to place the voice call. In some cases, such information could include a phone number or an IP address. Using such information, the system could identify the user. In other cases, the system could prompt the user to identify themselves.

Such prompting could be automated or be performed by a representative. If the prompting is automated, some embodiments could use Interactive Voice Response (IVR) technology to identify the user. In some cases, the IVR technology could use automated speech recognition or could allow the user to enter identifying information identifying themselves (e.g., Social Security Number) or account information (e.g., Insurance Account Number). If the prompting is performed by a representative, the representative could elicit such information to verify the user's identity.

Once the voice call is received, some embodiments may then route the voice call. Based on the user's identity, the system may retrieve information related to the user. If the voice call was routed to an Interactive Voice Response system, the Interactive Voice Response system may initially identify the user, as discussed above. The Interactive Voice Response system may also allow the user to carry out certain tasks without the need for human assistance. Alternatively, in some cases, the Interactive Voice Response system may establish that the user needs human assistance, and may place the voice call into a call queue to await human assistance.

Some embodiments may include provisions for routing a voice call directly to a human representative. In some embodiments, such routing is performed based on gathering information associated with the user and analyzing such information. In some cases, the user information may include a personalized digital intensity metric for the user and may include information about transaction frequency for the user. The transaction frequency information may include records of transactions along with timing information that may allow the system to analyze how frequently interactions occur over periods of time.

Some embodiments may use the results of the analysis of the personalized digital intensity metric and the transaction frequency to classify the user for handling the voice call in particular ways. As noted above, these categories may include two, three, or more categories. In some cases, the categories include a rare category and embodiments identify the user as a rare user. In some cases, once a user is categorized as a rare user, that user is routed to a special representative.

When a system receives digital intensity information and usage pattern data, it may be helpful to associate the raw data with a label or group. Some embodiments may include provisions for classifying the digital intensity information and the usage pattern data. In some cases, the usage pattern data will be classified by considering usage over set periods of time. One approach is to simply count usages for each month (or another time interval), and process such information into a usage score. In some cases, this could take the form of a total number of transactions in a set period or an average number of transactions in a set period.

Classifying the digital intensity score and the usage patterns may be based on a threshold. In some cases, if the digital intensity score or the usage patterns exceed a threshold, the relevant metric is considered high or frequent. In some cases, if the digital intensity score or the usage patterns are less than a threshold, which may be a different threshold, the relevant metric is considered low or infrequent. In some embodiments, the threshold or thresholds may be set empirically, in which different threshold values are used in experiments. Threshold values are then set based on the results. The threshold or thresholds may also be set by an a priori determination. In such an approach, a model, formula, or theoretical approach is used to set the threshold or thresholds. In other embodiments, other techniques may be used to interpret the digital intensity scores, such as sorting scores for users. In some embodiments, a weighted sum or another function may be used to combine the digital intensity score with the usage pattern data to interpret the raw data.

Based on considering information as discussed above, some embodiments may include provisions to categorize the user placing the voice call as common, uncommon, or rare. In those instances where a user is categorized as common, the system need not take any unusual actions. In some embodiments, a common user is handled in the regular order. In other embodiments, a common user is handled by a representative in the usual way. In those instances where a user is categorized as uncommon, the system may deviate from usual actions only slightly. In some embodiments, an uncommon user may be provided with facilitated access to a representative. However, in some embodiments, an uncommon user may be handled by a representative in the usual way. However, in other embodiments, the representative could help the common user or the uncommon user in other ways.

Some embodiments may include provisions directed to helping a user that is categorized as rare, such that the system may take certain actions to help the user. In some cases, a rare user may be provided with highly facilitated access to a representative. Such facilitated access may include providing additional information to a representative. Additionally, in some embodiments, the representative uses the information to provide customized service for the rare user. In some embodiments, such customized service involves special handling of consents and user agreements.

To perform such special handling, the representative may access consent documents for the rare user and may work with the rare user to obtain consent documents. In some embodiments, the consent documents are pending consents. In some embodiments, the consent documents are anticipated consents. However, in other embodiments, the representative could help the rare user in other specialized ways.

Some embodiments include provisions so the system can also facilitate user agreements and other member consents. In some cases, these provisions provide information to a representative for customers with low digital intensity. The system may notify a representative that the user has a low digital intensity and may instruct the representative to help the user with the consents. In some cases, the system may prepare information for the consents and send it to the representative as the voice call is routed. Also, in some cases, the system may autopopulate the consents to make the consent process as easy as possible. In some cases, the system gathers old, unauthorized consents and sends these consents to the representative. In some embodiments, the system also predicts a time interval corresponding to when the user will next use the system and pre-sends these consents. The system may then help the representative secure the requisite signatures and consents from the rare user. In some cases the consents are performed electronically, while in other cases other means are used to gather consents. The system may provide future agreements and consents during this representative call because a long time may elapse before the rare user may be available to handle agreements and consents again.

FIG. 1 illustrates a schematic view of relative measures of digital intensity for users in a system, according to an embodiment. FIG. 1 shows a diagram 100 of four users, specifically user 1 102, user 2 104, user 3 106, and user 4 108. Each user is associated with a stacked column graph that illustrates a quantity of interactions with a business across three types of interaction. The illustrated interactions include Web-based interactions, phone-based interactions, and mobile app interactions. For example, user 1 102 may be associated with metrics for Web-based interactions 112, phone interactions 122, and mobile app interactions 132. User 2 104 may be associated with metrics for Web-based interactions 114, phone interactions 124, and mobile app interactions 134. User 3 106 may be associated with metrics for Web-based interactions 116, phone interactions 126, and mobile app interactions 136. User 4 108 may be associated with a metric for phone interactions 118.

The personalized metrics illustrated in FIG. 1 show general amounts of activity by type of interaction associated with user 102, user 104, user 106, and user 108. These metrics may be derived in certain ways. In some cases, the metrics may be associated with certain time intervals. As examples, the metrics could be measures of interactions in the last month, the last 3 months, in the last 6 months, in the last year, in the last 2 years and so on.

Alternatively, embodiments may track interaction activity for a long period of time (for example, the last five, ten, or twenty years). If there is a record of interaction activity over a long period of time, it may be possible to adjust a time interval accordingly. In some cases, the embodiments could acquire and store activity for a long period of time, such as the last ten years, and then select a window that may be a subset of time to be considered for analysis. For example, the window could initially be the last two years, and then be adjusted to be the last three years based on the goals of the analysis.

From the personalized metrics shown in FIG. 1 and associated data, it may be possible to infer how frequently a given user interacts with a business. It may also be possible to determine how much digital interaction may be associated with particular users. As discussed above, digital interactions have the advantage of being largely automated. Other interactions, such as voice interactions, are not considered digital interactions. Such interactions may involve more resources in that they are harder to automate.

For example, user 1 102 performs a moderate amount of interaction over the Web 112, a moderate amount of interaction on the phone 122, and a moderate amount of interaction via a mobile device 132. User 2 104 performs a moderate amount of interaction over the Web 114, a moderate amount of interaction on the phone 124, and a large amount of interaction via a mobile device 134. User 3 106 performs a small amount of interaction over the Web 116, a moderate amount of interaction on the phone 126, and a moderate amount of interaction via a mobile device 136. User 4 108 performs a small amount of interaction, all of which occurs over the phone.

User 1 102, user 2 104, and user 3 106 each interact with the system fairly frequently. A significant portion of their interaction is digital. Of these users, user 1 102 and user 2 104 have relatively little phone interaction, A large portion of interactions by user 3 106 are still by phone. FIG. 1 also shows that user 4 108 may be digitally involved with a business far less than user 1 102, user 2 104, and user 3 106. User 4 108 only interacts with the business by phone.

User 4 108 only interacts with the business infrequently and only by phone. User 4 108 may accordingly be considered to be a rare user. Thus, it may be desirable to make maximum utilization of the few interactions that do occur. Another observation that may be made from FIG. 1 may be that user 3 106 has somewhat fewer total interactions than user 1 102 or user 2 104. However, user 3 106 does have some digital interactions. Thus, user 3 106 may be classified as an uncommon user. User 3 106 uses digital interactions, just not very often.

An uncommon user may be a user that does not interact with the business frequently. An uncommon user may interact frequently enough or may have a sufficient digital intensity score that special treatment by a representative may not be appropriate. An uncommon user may be given priority when being served. However, the uncommon user may not have special treatment from a special representative, beyond being served sooner. While the information shown in FIG. 1 may be useful in helping users, it may be helpful to have a more precise approach for measuring digital intensity. A more precise approach may then help automatically classify users and help users once classified.

Figure 2A:
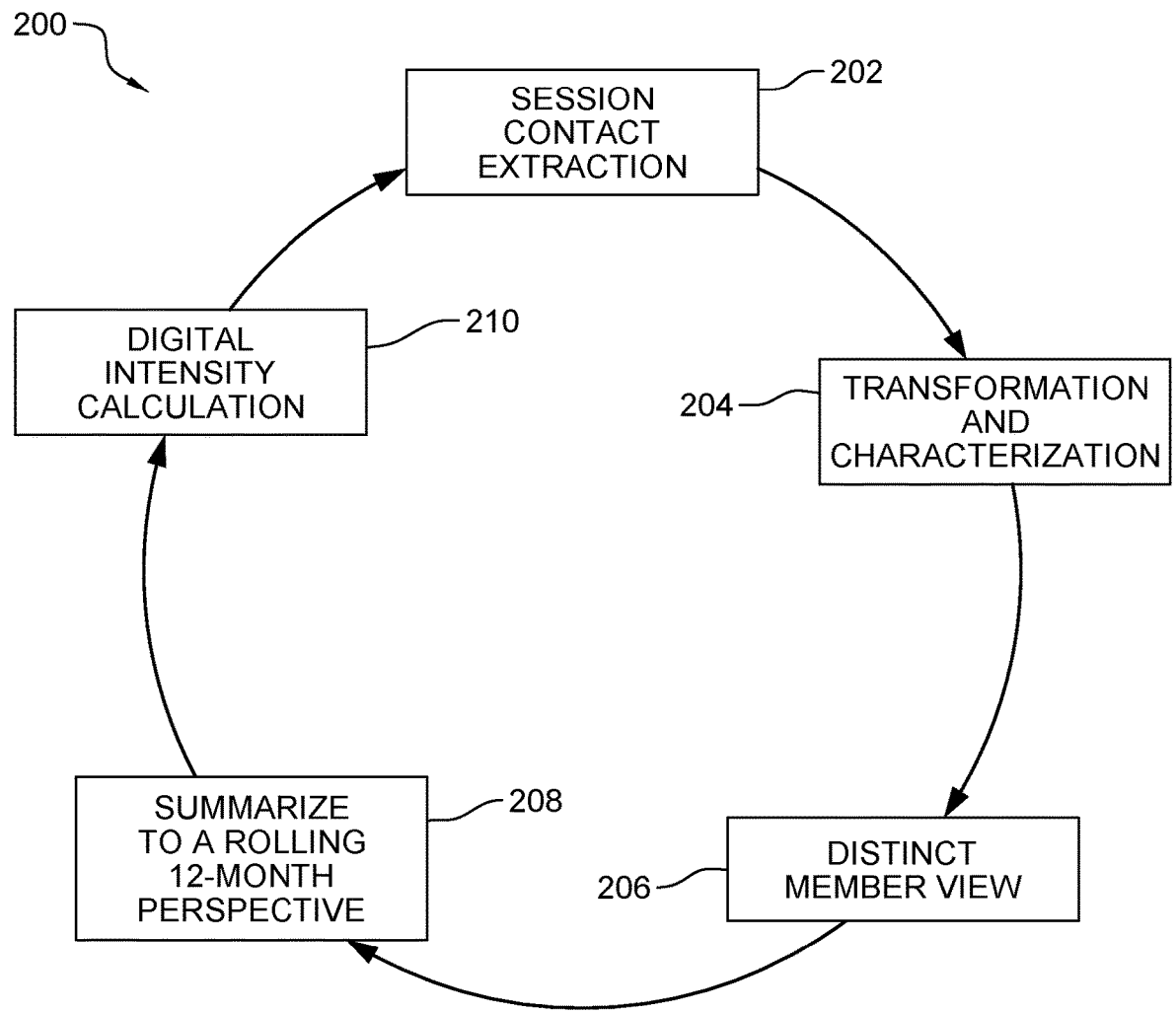
FIG. 2A illustrates a schematic view of a process for calculating digital intensity and related scores for users in a system, according to an embodiment.
Figure 2A:
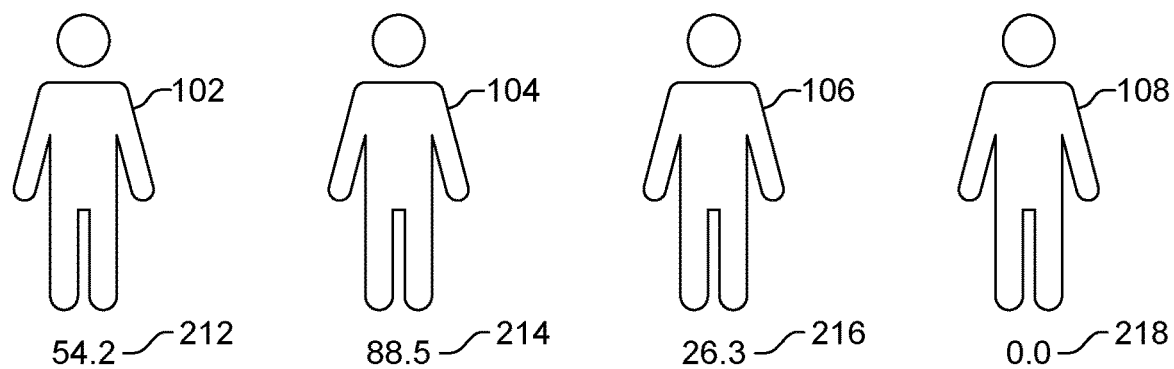

FIG. 2A illustrates a schematic view of a process for calculating digital intensity and related scores for users in a system, according to an embodiment. The process 200 may provide digital intensity metric implementation steps. Such steps may be repeated as a series of steps. The steps may help understand member activity to better utilize representatives. The process may also involve segmentation of membership into groups for additional analysis.

Some embodiments may include provisions for using the digital intensity scores in user transactions. As discussed, having a digital intensity score allows various responsive actions in the context of a voice call for a rare user. In some cases, a digital intensity score may be used to modify how an online interaction may be conducted for a rare user. In some cases, the digital intensity score may cause modifying the operation of a mobile app or by modifying a Web interaction for the rare user. In some cases, a mobile app or a Web interaction takes into account the infrequent access and low digital intensity. Key performance indicator (KPI) measurement and related scorecards may guide measurements of performance for the new approaches beyond simply digital adoption according to current industry standards. Using digital intensity scoring may formulate strategy at a micro-level for members and member segments identified by these approaches that may be more targeted.

FIG. 2A shows some example steps that may be a part of a personalized digital intensity metric that may utilize a unique data transformation process 200. For example, the following five steps may provide a new and effective set of steps for implementing such a digital intensity metric. A first step 202 may include session content extraction. A second step 204 may include transformation and characterization. A third step 206 may include a distinct member view. A fourth step 208 may include summarizing to a rolling 12-month perspective. A fifth step 210 may include a digital intensity calculation. In the example of FIG. 2A, the data being processed may be that of members of an insurance company. Hence, the users of the system are referred to as members. However, members of an insurance company are only examples of users of a system whose digital intensity may be tracked and processed. Other terms (clients, customers, etc.) may refer to users in other contexts.

In the first step 202, session contact extraction may occur. Such session contact extraction may involve obtaining data records. Such data records may include information about sessions and contacts between users and the business. Such information may be organized by channel. Later steps will consider with which channel the transactions are associated. In particular, the information may indicate whether sessions and contacts involve digital or non-digital interactions. For example, normalized tables logging sessions and contacts by channel may be gathered to represent many interactions per member.

By gathering such data, it may then be possible to leverage enterprise data warehouse channel interaction data. Such interaction data may include a huge amount of raw data related to many individual users. Thus, the session contact extraction in first step 202 obtains information about sessions associated with user activity for analysis later in the method 200. Such information may be contained in tables that may be obtained from a data source such as a database or another data warehouse, such as a cloud-based data repository, as non-limiting examples.

In the second step 204, transformation and characterization may occur. The transformation and characterization may include a transformation of the session contact information received from the first step 202. In such a transformation, the data may be processed by grouping and characterizing individual members' channel contacts. Such grouping and characterizing produces a monthly snapshot of the individual member's activity.

In the third step 206, the method may identify a distinct member view. The distinct member may be identified by a transposing operation and an assignment operation, performed on the data. In the transposing, embodiments may rotate the data to provide a distinct member view. Such transposing involves accessing the normalized tables and changing rows with columns to access individual member's channel contacts. In the assignment operation, embodiments may use the transposed data and assign each member a Venn space in one of 7 regions. Embodiments may fill in gaps in the data by including no interaction entries, corresponding to silence.

For example, in the Venn space, channels of interaction may include mobile, Internet, and phone. The 7 regions in the Venn space may indicate which of the channels correspond to a given member's information for monthly periods, in some cases. In some cases, the grouping may group channel actions for longer time periods, such as 90-day time periods. For example, region 1 may be users using solely mobile interactions, region 2 may be users using solely Internet interactions, region 3 may be users using solely phone interactions, region 4 may be users that use Internet and mobile interactions but not phone interactions, region 5 may be users that use Internet and phone interactions but not mobile interactions, region 6 may be users that use mobile and phone interactions but not internet interactions, and region 7 may be users that use all of mobile, Internet and phone interactions. By assigning members to these Venn regions, each member may be characterized along with the channels the member has used and not used over the 90-day period.

In the fourth step 208, the method may summarize member behavior into a rolling 12-month perspective. For example, each month of member behavior may be characterized as no contact, only digital, only phone, or a combination of digital and phone. Such summarization may be based on using the distinct member view from the third step 206. Once the characterization occurs, an expansion occurs in which a monthly perspective expands the monthly perspectives to a rolling 12-month window. Using a 12-month window may incorporate seasonality and annual patterns of behavior for each individual member. For example, being able to consider different behavior between the member that occurs during the winter when contrasted with the member behavior during the summer may have value or show patterns. For example, the member may use the Web more in the winter, and the mobile device more in the summer.

In the fifth step 210, the method may make a digital intensity calculation. Such a digital intensity calculation may be found by calculating total opportunities, calculating a number of opportunities that were exclusively digital, and taking the quotient as a digital intensity metric. Opportunities refer to a denominator including total interactions between users and the provider. Such a quotient may be a flexible, tailorable value that may assist business owners to improve digital adoption and acceleration of such digital adoption. The quotient may be expressed numerically. In some cases the digital intensity score is represented as a number between 0 and 100 representing a percentage, while in other cases the digital intensity is expressed as a number between 0 and 1. In these cases, 0 means no digital intensity and 100 or 1 means complete digital intensity. However, it may also be possible to express the digital intensity in other ways that may communicate the information. For example, the digital intensity could be expressed as a letter or a descriptive word.

As shown in FIG. 2A, the digital intensity metric implementation may involve a cyclic process. After fifth step 210, the method may return to first step 202 for another cycle of steps to improve and update the digital intensity metric. Because the members continue to interact with the system over time, the digital intensity may evolve as the members' behavior evolves. Moreover, the digital intensity score may change based on changes in user behavior. In some cases, the digital intensity score may increase or decrease. The digital intensity score may increase if the user uses a mobile app or a website more frequently. The digital intensity score may decrease if the user uses the phone more often. However, the digital intensity score may also be a quotient, so the digital intensity score will also change based on the total number of interactions a given member has with the system in a given time interval.

A goal of using a personalized digital intensity metric as discussed in FIG. 2A may be to attempt to increase a user's digital intensity score, advocating for a higher proportion of digital interactions. Another application of using a digital intensity metric may be to identify users that largely use phone interactions. In particular, embodiments may focus on how best to help users that have low digital intensity, and rarely call. Having the digital intensity metric may be even more valuable in combination with information about how frequently a member accesses the system.

Once the personalized digital intensity metric is calculated, a resulting personalized score may be associated with each user. For example, user 1 102 may be associated with a score 212 of 54.2, user 2 104 may be associated with a score 214 of 88.5, user 3 106 may be associated with a score 216 of 26.3, and user 4 108 may be associated with a score 218 of 0.0. These scores may be used to classify users as "rare," "uncommon," or "common" as shown in greater detail in FIG. 3. However, in general, user 1 102 has moderate digital intensity with a score of 54.2 at 212, user 2 104 has high digital intensity with a score of 88.5 at 214, user 3 106 has low digital intensity with a score of 26.3 at 216, and user 4 108 has a zero digital intensity with a score of 0.0 at 218. Thus, a business may direct some of its efforts to increase the digital intensity of user 3 106 since user 3 has a relatively low digital intensity. A business may especially wish to encourage user 4 108 to interact digitally, because user 4 does not yet have any digital interactions.

Figure 2B:
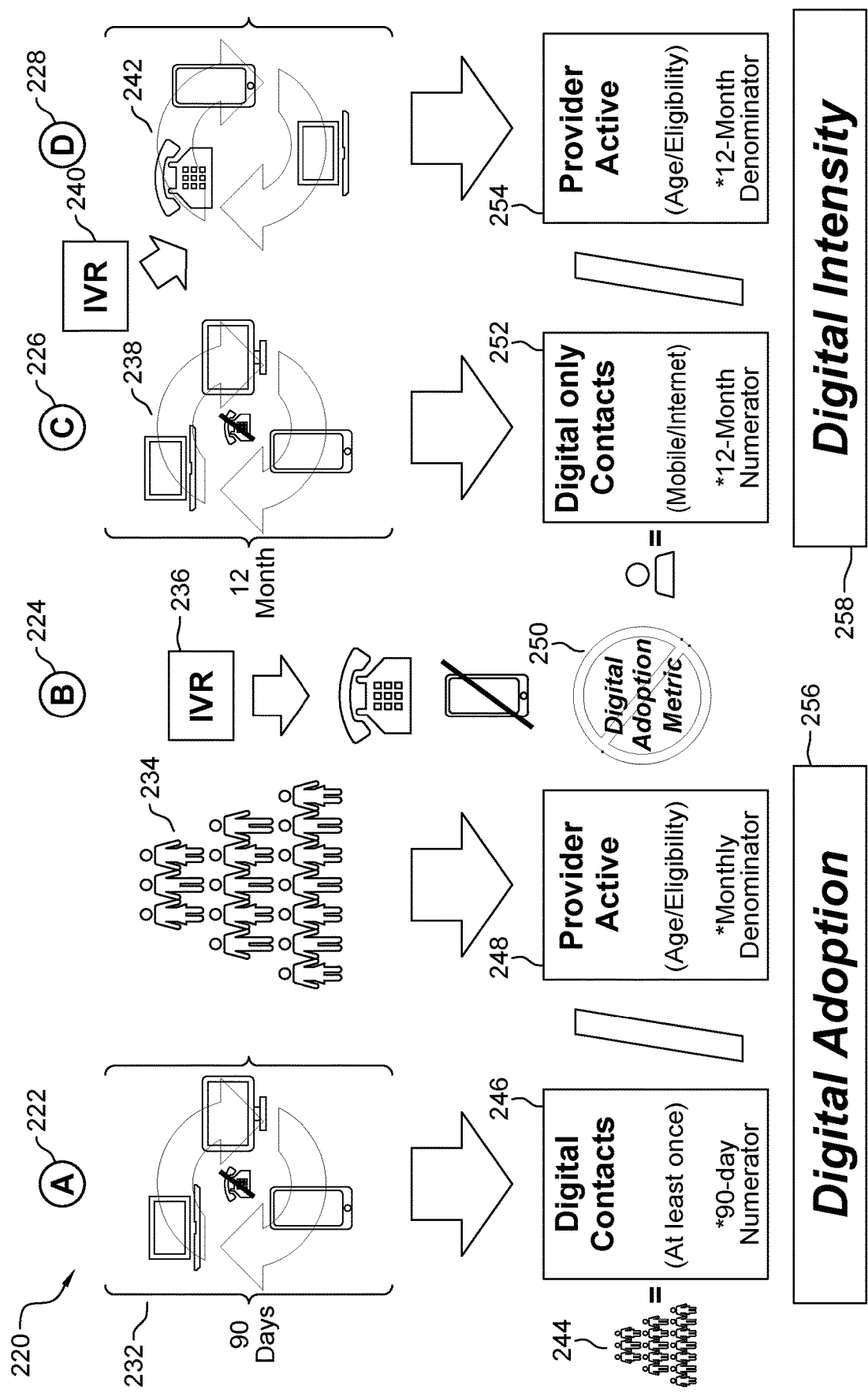
FIG. 2B illustrates aspects of calculating a digital adoption score and a digital intensity score based on activity of users in a system, according to an embodiment.

FIG. 2B illustrates aspects of calculating a digital adoption score and a digital intensity score based on activity of users in a system 220, according to an embodiment. For example, FIG. 2B shows a portion A 222 corresponding to deriving a digital adoption score, a portion B 224 corresponding to which information is included in a digital adoption metric, a portion C 226 corresponding to identifying digital only contacts, and a portion D 228 corresponding to identifying total contacts. For example, in portion A 222, a group of users 244 is counted in conjunction with digital transactions 232 over a 90-day period. Digital transactions 232 count interactions such as those using a web browser of a laptop or a desktop computer, or using an application such as a mobile app or web browser of a mobile device, excluding transactions performed using a telephone. Thus, digital contacts 246 represent users from the group of users 244 that contact an online provider using some sort of digital contact at least once during a 90-day period.

Portion A 222 also shows a group of users 234 that are analyzed to obtain a count of active members for a provider's active clients 248. In portion B 224, FIG. 2B shows Interactive Voice Response (IVR) interactions, which then are handled by telephone, rather than by a mobile app. Thus, these interactions are excluded from the digital contacts 246 used for the digital adoption metric 256 as indicated at symbol 250. Accordingly, digital adoption 256 is found as a quotient of digital contacts 246 and a total number of eligible provider clients 248. Portions C 226 and D 228 show deriving digital only contacts 252 and a tally of all provider active contacts 254. For example, digital interactions 238 show interactions from devices such as laptops, desktops, and mobile devices such as smartphones and tablets. Digital interactions 238 specifically exclude interactions using the telephone. The result is a value of digital only contacts 252 associated with a user. Such digital only contacts 252 refer to mobile and internet contacts, tabulated as a 12-month numerator 252. However, with respect to digital intensity, an IVR interaction 240 may lead to an interaction 242 with a phone, a mobile device, or a computer.

In order to derive the 12-month denominator, the system tabulates a total number of provider active interactions 254 associated with a certain age and eligibility. By dividing the digital only contacts 252 by the total number of provider active contacts 254 over a 12-month period, the system is able to calculate a quotient of digital intensity 258. Thus, digital adoption 256 measures an overall amount of digital contact 246 over a population 234, while digital intensity 258 measures, for each month in a 12-month period, which fraction of months in which a transaction occurred are digital-only for an individual user.

FIG. 2C illustrates a table of activity by users over the course of a year, and shows aspects of calculating digital intensity based on the table 260, according to an embodiment. Each of the rows 262 of the table 260 corresponds to a member of an online provider. The table 260 also includes columns 264, each of which corresponds to a month in a 12-month period. For example, FIG. 2C shows a time window beginning in February 2020 and continuing to January 2021. The meaning of the entries in table 260 is explained in Venn diagram 278 and key 280. In Venn diagram 278, as discussed above, region 1 may be users using solely mobile interactions, region 2 may be users using solely Internet interactions, region 3 may be users using solely phone interactions, region 4 may be users that use Internet and mobile interactions but not phone interactions, region 5 may be users that use Internet and phone interactions but not mobile interactions, region 6 may be users that use mobile and phone interactions but not internet interactions, and region 7 may be users that use all of mobile, Internet and phone interactions. Thus, as indicated in key 280, an entry of OMNI indicates both phone and digital interactions (including both phone and digital interactions, corresponding to regions 5, 6, and 7), an entry of PHN indicates phone only interactions (including phone interactions, corresponding to region 3), an entry of DIG indicates solely digital interactions (including mobile and internet interactions only, corresponding to regions 1, 2, and 4). An entry of "–" indicates that there were no interactions during the given month, and hence there were no contact opportunities that could be shifted to being solely digital. If all of a user's interactions are empty, that user could be ignored or associated with a 0% digital intensity value.

Thus, in FIG. 2C, column 266 is a column listing a total of digital contacts over the course of a year and column 268 is a column listing a total number of contact opportunities. Column 270 is a digital intensity rate, expressed as a percentage, rounded to the nearest even percentage, found by dividing the value for each member of the total of digital contacts from column 266 by the total contact opportunities form column 268. While column 270 shows the digital intensity rate, it may be recognized that alternative numerical formats, such as a fraction or a decimal fraction may show the digital intensity rate and different types of routing may be used. In addition to the individual totals for digital contacts recorded in column 266, FIG. 2C also shows finding a total number of digital contacts 272, which in the example of FIG. 2C is 40, finding a total number of contact opportunities 268, which in the example of FIG. 2C is 96, and dividing these two totals to find an overall digital intensity rate 276, which in the example of FIG. 2C is 42%.

Figure 2D:
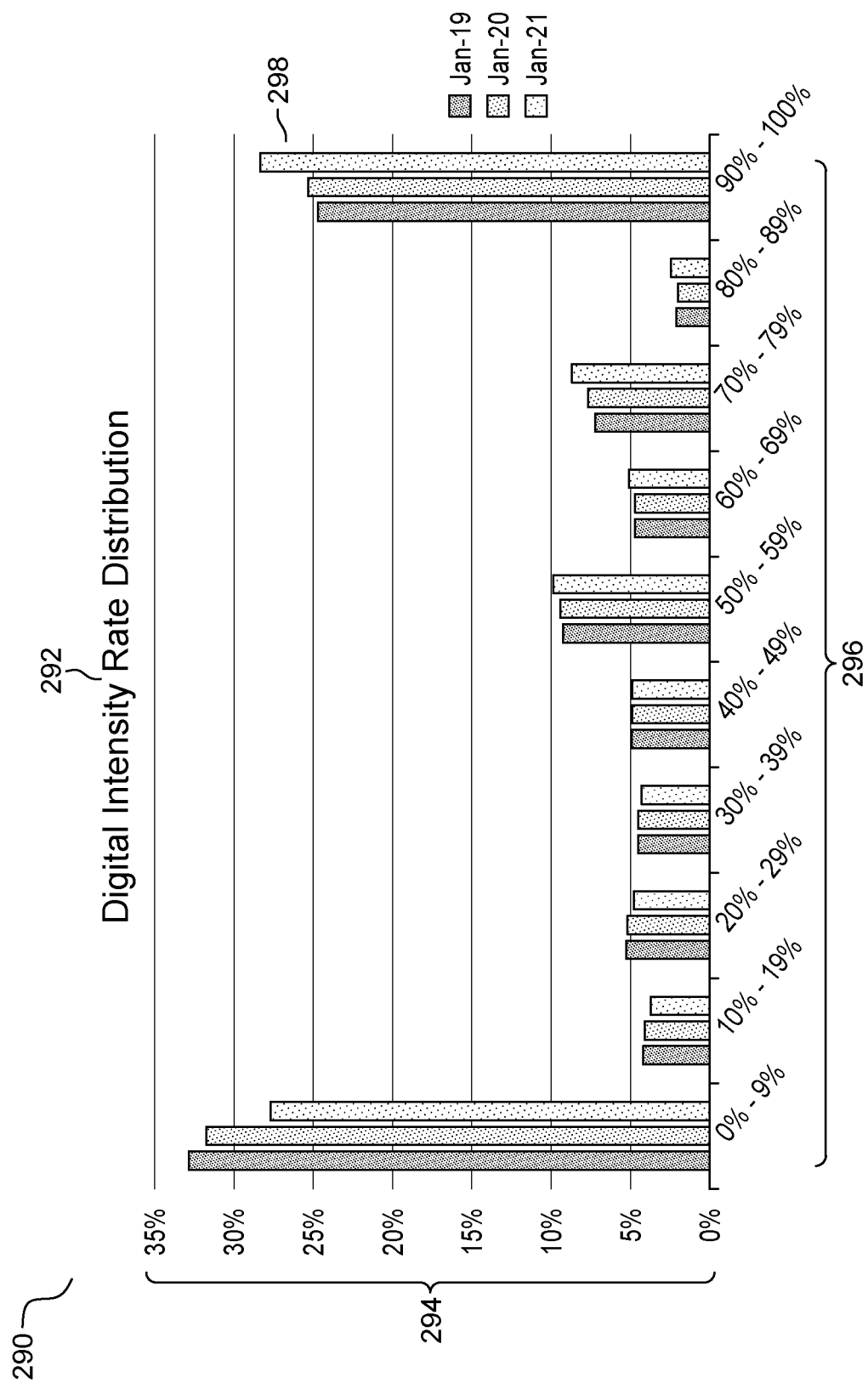
FIG. 2D illustrates a horseshoe diagram showing a digital intensity rate distribution and how it changes over time, according to an embodiment.

FIG. 2D illustrates a horseshoe diagram showing a digital intensity rate distribution and how it changes over time 290, according to an embodiment. The diagram is referred to as a horseshoe diagram because much of the distribution is situated at the beginning and end of the distribution, creating a diagram that resembles a horseshoe. For example, the diagram is labeled as a digital intensity rate distribution 292. The y-axis 294 corresponds to a portion of the group of the overall pool of users that fall within a given range of digital intensity and the x-axis 296 corresponds to ranges of digital intensity. For example, the x-axis divides the pool of users into ranges from 0%-9%, 10%-19%, and so on. The data 298 shows how digital intensity values are distributed at a given year and how they change over time. For example, the digital intensity values for 10%-19% through 80-89% are all relatively low. However, there are many users with a digital intensity value of 0%-9% and many users with digital intensity value of 90%-100%.

In addition, FIG. 2D shows that, over the years presented as January 2019, January 2020, and January 2021, the proportions of users with very low digital intensity (0%-9%) decrease from year to year and the proportions of users with very high digital intensity (90%-100%) increase from year to year. For proportions of user with relatively low digital intensity (10%-19%, 20%-29% and 30-39%), the proportions generally decrease slightly from year to year. For proportions of users with moderate digital intensity (40%-49%) the proportions stay about the same from year to year. For proportions of users with relatively high digital intensity (50%-59%, 60%-69%, 70%-79%, and 80-89%), the proportions generally increase slightly from year to year. Thus, FIG. 2D illustrates that digital intensity follows a horseshoe shape, such that most users either use exclusively digital interactions very often or very infrequently. FIG. 2D also illustrates a shift from low digital intensity to high digital intensity from 2019 to 2021, in that the parts of the diagram 290 corresponding to lower digital intensity gradually decrease as those users shift to higher digital intensity portions.

Figure 3:
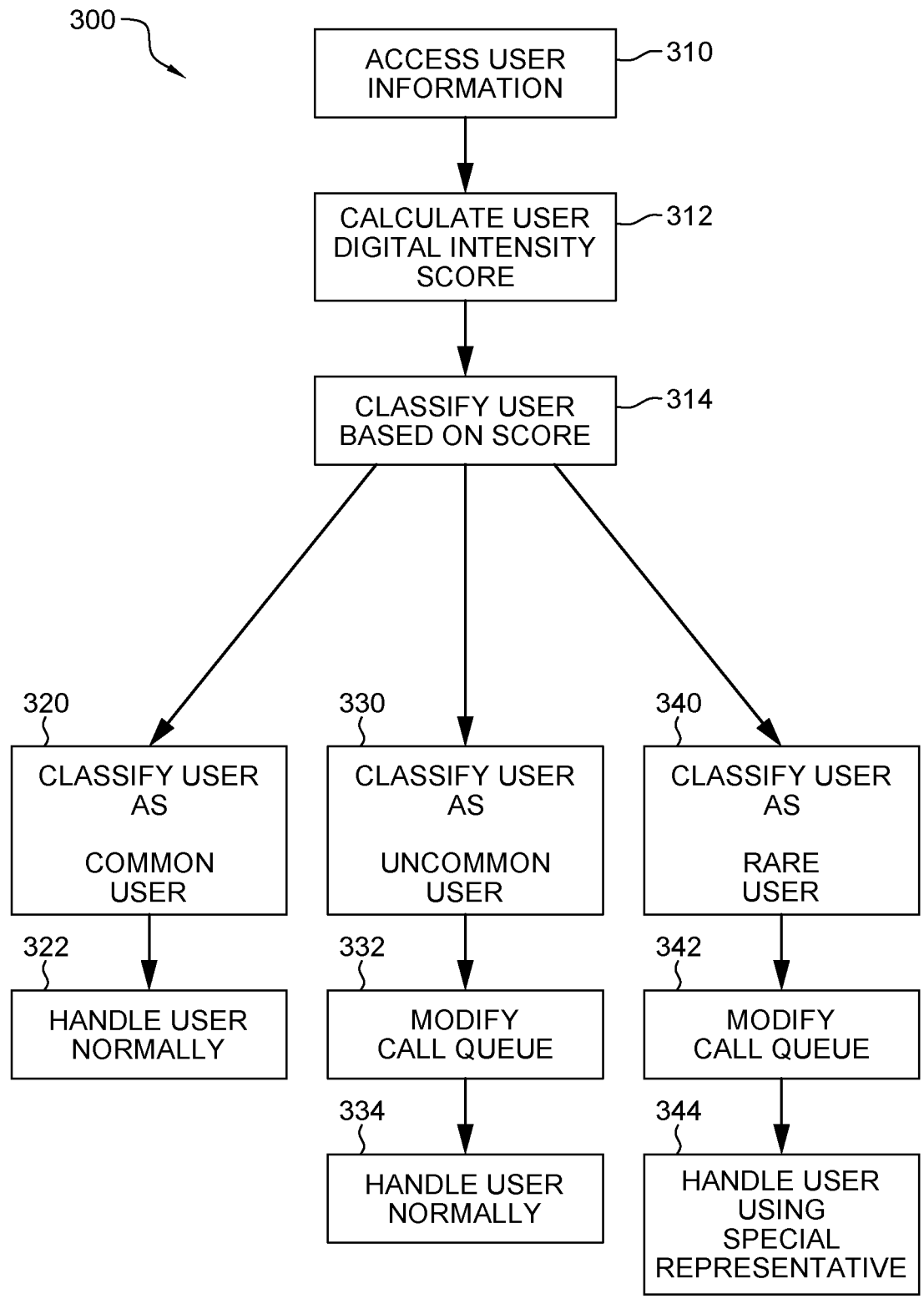
FIG. 3 illustrates a flowchart of measuring digital intensity, classifying users accordingly, and taking appropriate responsive action, according to an embodiment.

FIG. 3 illustrates a flowchart of measuring digital intensity, classifying users accordingly, and taking appropriate responsive action, according to an embodiment. FIG. 3 assumes that a user, also referred to as a calling user, has placed a voice call to the system in order to obtain assistance. In some embodiments, the calling user may desire to speak with a representative to carry out some sort of transaction with the business being called. In some cases, the calling user may have a question (such as a balance inquiry or an inquiry into a claim status) or may wish to complete a transaction (such as paying an insurance premium or submitting an insurance claim).

For example, the flowchart shows a method 300 that may include a first step 310 of accessing user information. As described above, such accessing may involve using a data repository including records for a given business. The records may include information about transactions by users over a period of time. Such information may include information for many individual users A second step 312 may follow, including calculating a user digital intensity score for a given user. Such calculating may correspond to method 200 from FIG. 2A. The calculating may include the steps of session contact extraction 202, transformation and characterization 204, distinct member view 206, summarize to a rolling 12-month perspective 208, and digital intensity calculation 210. Greater details of these steps may be found in the discussion of FIG. 2A and the method 200.

A third step 314 may follow, including classifying the user based on the user digital intensity score. The classifying may also consider other information, such as patterns in user access. Such patterns may include information such as when the user last logged in, how many interactions the user had during a given timeframe, and so on. FIG. 3 shows three potential ways of classifying a given user. The three classifications in FIG. 3 include a common user, an uncommon user, and a rare user. For a user to be a common user, the user may have a high digital intensity score and a high frequency of access. For a user to be an uncommon user, the user may have a somewhat lower digital intensity score, and a somewhat lower frequency of access. For a user to be a rare user, the user may have a low (or zero) digital intensity score, and a low frequency of access. The classification of a user as common, uncommon, or rare may be based on digital intensity and on frequency of access in various ways, as discussed further, above.

In a step 320, the user may be classified as a common user. If the user may be classified as a common user, the system handles the user normally in step 322. Handling the user normally entails that the calling user will be routed to a representative in the normal order. That representative will not be instructed to take any unusual steps when helping the calling user.

FIG. 3 also shows a step 330 in which the user may be classified as an uncommon user. If the system classifies the user as an uncommon user, the system may modify the call queue in step 332. The system may then handle the user normally in step 334. The modifying of the call queue in step 332 is shown in greater detail in FIG. 4. Step 334 corresponds to step 322, in that the representative may not take special steps for an uncommon user. The method proceeds in this way for an uncommon user because it may be helpful to prioritize access for an uncommon user. The uncommon user may sign on frequently enough that it may be possible to handle requests by the uncommon user in the ordinary manner.

FIG. 3 also shows a step 340 in which the user may be classified as a rare user. If the system classifies the user as a rare user, the system may modify the call queue in step 342, as shown in greater detail in FIG. 4. The system may also handle the user using a special representative in step 344, as shown in greater detail in FIGS. 5-7. A rare user only signs on and uses the system infrequently. A rare user also has a low level of digital intensity. By prioritizing such a rare user in the call queue, it may be more likely that the rare user will continue the transaction. Thus, it may be easier for a rare user to handle urgent matters in a single call.

By connecting the rare user to a special representative, the special representative can take steps to encourage the rare user to increase the digital intensity value of the rare user by incentivizing digital interactions. The special representative can also maximize the current interaction's ability to handle pending matters. It may also be possible to predict transactions that may arise before the user's next interaction. Such transactions may be conducted with the rare user during the current transaction. This approach obviates the burden for the rare user to carry out these transactions in the future. If such transactions do not occur until the next interaction, the relevance of the transactions may lapse or otherwise expire.

Figure 4:
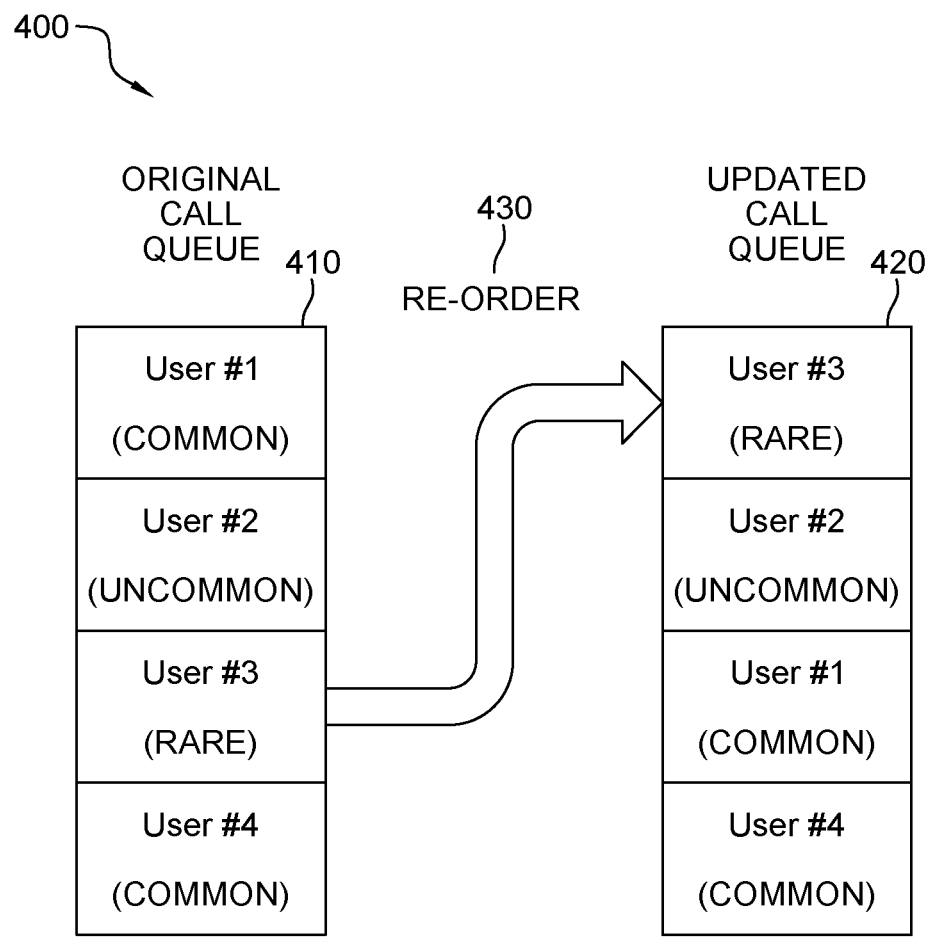
FIG. 4 illustrates a schematic view of modifying a call queue based on prioritizing users, according to an embodiment.

FIG. 4 illustrates a schematic view of modifying a call queue based on prioritizing users, according to an embodiment. FIG. 4 shows a diagram 400 of a re-ordering of a call queue. In general, a queue follows a first-in, first-out order. Calls may be handled in chronological order based on when the calls originate. For example, original call queue 410 may be transformed using a re-ordering process 430 into updated call queue 420. Re-ordering 430 prioritizes users that only call rarely for interaction with a service representative.

For example, original call queue 410 may originally include four users that desire the assistance of a customer service representative during a voice call. Original call queue 410 may originally include four users in a chronological order, such as user #1, who may be a common user of the system, user #2, who may be an uncommon user of the system, user #3, who may be a rare user of the system, and user #4, who may be a common user of the system. Ordinarily, representatives would serve the users in this chronological order. The users in FIG. 4 differ from those presented in FIGS. 1-2, as they are used to illustrate a different concept.

In an embodiment, the users of original call queue 410 may experience a re-ordering 430. In general, re-ordering 430 preserves the ordering of users of a given usage frequency. The re-ordering 430 prioritizes interacting with rare users, then uncommon users, then common users. Doing so incentivizes prioritized users to complete the transaction by limiting their wait times. For example, after re-ordering 430, the updated call queue 420 includes a new ordering of user #3, who may be a rare user, user #2, who may be an uncommon user, user #1, who may be a common user, and user #4, who may also be a common user.

The example shown in FIG. 4 illustrates that the updated call queue 420 causes the member service representative to serve first the rare user, namely user #3, then the uncommon user, namely user #2, then the common users, namely user #1 and user #4. Within a group, the original order may be preserved. For example, with respect to common users, the original ordering of user #1 then user #4 may be preserved. While re-ordering is shown as using grouping, it may also be possible to re-order based on digital intensity and usage frequency in other ways. For example, the re-ordering may sort users based on digital intensity, based on usage frequency, or based on a weighted combination or another function of these values. Other examples may use only two tiers such as common and rare, and may re-order the call queue accordingly.

A goal of the re-ordering may be to ensure that rare and uncommon users are served as quickly as possible. A common user may use the system fairly often, and may be tolerant of a longer wait time. For a rare user, the system may wish to do whatever may be possible to ensure that the rare user has immediate access to a member service representative. The rare user may have limited patience. Ensuring that the rare user may be served first, then the uncommon user, then the common users, may maximize the chances of successfully interacting with less frequent users.

Figure 5:
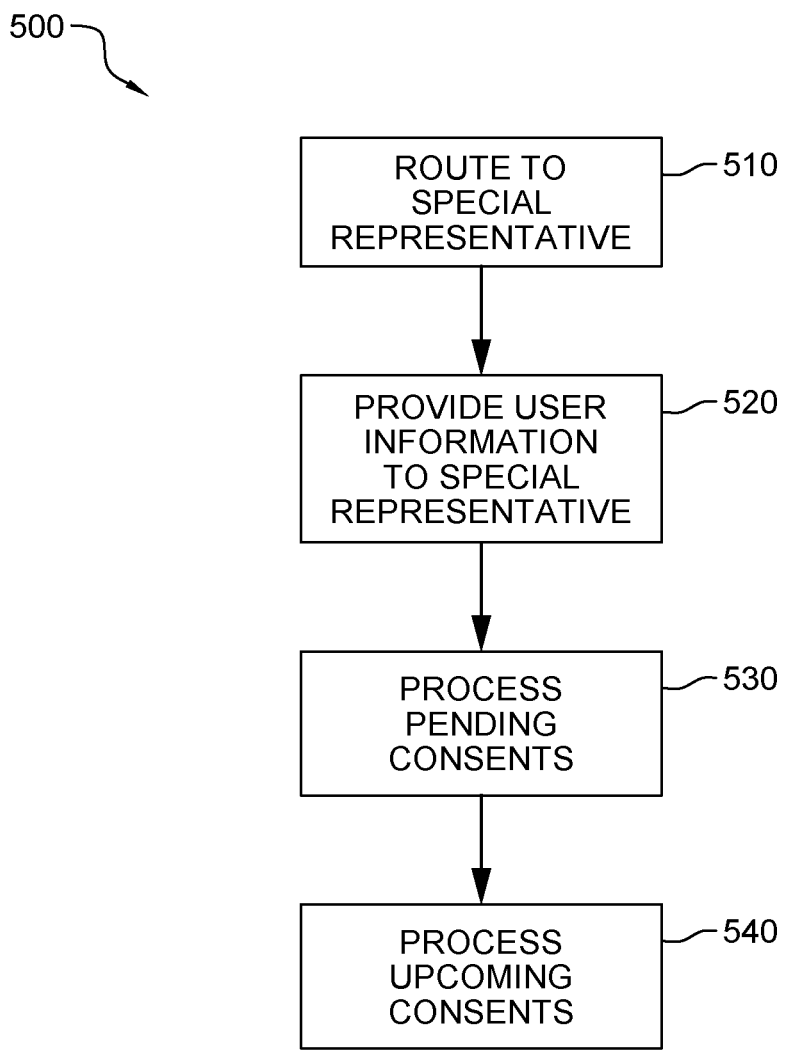
FIG. 5 illustrates a flowchart of a method used to serve a rare user, according to an embodiment.

FIG. 5 illustrates a flowchart of a method 500 used to serve a rare user, according to an embodiment. Starting at step 510, the method 500 may route a voice call from a rare user to a special representative. As discussed previously in FIGS. 2A-2D and FIG. 3, user information, including a digital intensity score and usage history may be used to ascertain whether a user may be a rare user. Once it is established that a user is a rare user, an initial step 342 indicates that the call queue may be modified so that the rare user may interact with a special representative as soon as possible in step 344. For example, there may be one or more special representatives or other trained individuals present in a call center, an office, or another setting in which a special representative may be able to provide human assistance to a rare user over the phone. Such special representatives may be referred to as special representatives because they are specially trained to deal with the rare users during a voice call. The special representative may be trained to take various steps that may increase the frequency of utilization of the rare user or may increase the digital intensity score of the rare user. In some cases, the special representative to take steps that may cause the rare user to sign on more often or increase digital intensity. The special representative may propose incentives and inducements that reward frequent usage of the system, particularly through digital channels.

In step 520, the method 500 may provide user information to the special representative. Some embodiments may include provisions to provide various information to the special representative. Some embodiments provide that, when a rare user is routed to such a special representative, the special representative may receive information about the user. In some cases, the information pertains to the identity of the user, while in other cases the information pertains to account information and information about the access history of the user.

In some embodiments, the special representative may receive identification information for the user. Such identifying information may include the user's name and identifying information. In some cases, the identifying information may include official government identifiers or account information linked to the user. The user's name and identifying information may be helpful for several reasons. First, the user's name will help access their account and associate transactions with the account. Second, having the user's name allows the special representative to address the user more familiarly. Indeed, with respect to this particular caveat, it may be helpful for the specifical representative to be made aware of a nickname or other preferred name.

However, the special representative may benefit from other information about the user. For example, it may help the special representative to have access to routine account information for the user so the special representative can answer questions and conduct transactions in the ordinary way. In some embodiments, as account information, the special representative may also be provided with information about consents for the user, such as pending and upcoming consents. Additional details of such consents are discussed with respect to steps 530 and 540 and in the discussion of FIGS. 6-7. In some embodiments, access history information may also be provided as helpful for the special representative to have information related to the user's digital intensity and usage patterns. In some cases, such information is summarized as a score or another metric to help the representative understand the information quickly.

In step 530, the method 500 may process pending consents. Greater details of step 530 are presented in FIG. 6. In general, processing pending consents may give a rare user the ability to handle a number of consents that have accumulated since the last interaction between the rare user and the system. Such an approach may maximize the benefit of the rare occasions on which the rare user may be available to agree to these conditions.

In step 540, the method may process upcoming consents. Greater details of step 540 are presented in FIG. 7. The processing of upcoming consents that may occur in step 540 may be related to that of pending consents in step 530. However, step 530 and step 540 differ. Step 530 may involve handling pending consents, while step 540 may involve handling upcoming consents. In step 530, the system knows that the consents may exist and be relevant to the user's account. By contrast, in step 540, the upcoming consents may be projected consents. In some cases, the upcoming consents may include scheduled consents that are expected to utilize the user's attention before the next time the user signs on.

Method 500 shows certain elements of interaction between a special representative and a rare user, such as processing pending consents in step 530 and processing upcoming consents in step 540. However, embodiments may provide for additional interaction between the special representative and the rare user. In some embodiments, the special representative may provide typical interactions made in a call, based on what the rare user would like to do. In some cases, the special representative may provide the rare user with answers to questions, such as information about an account held by the user. The special representative may also allow the user to conduct certain transactions, depending on the nature of the system. In some embodiments, an insurance system may allow filing of a claim, while an investment system may allow transferring assets from one investment instrument to another.

Figure 6:
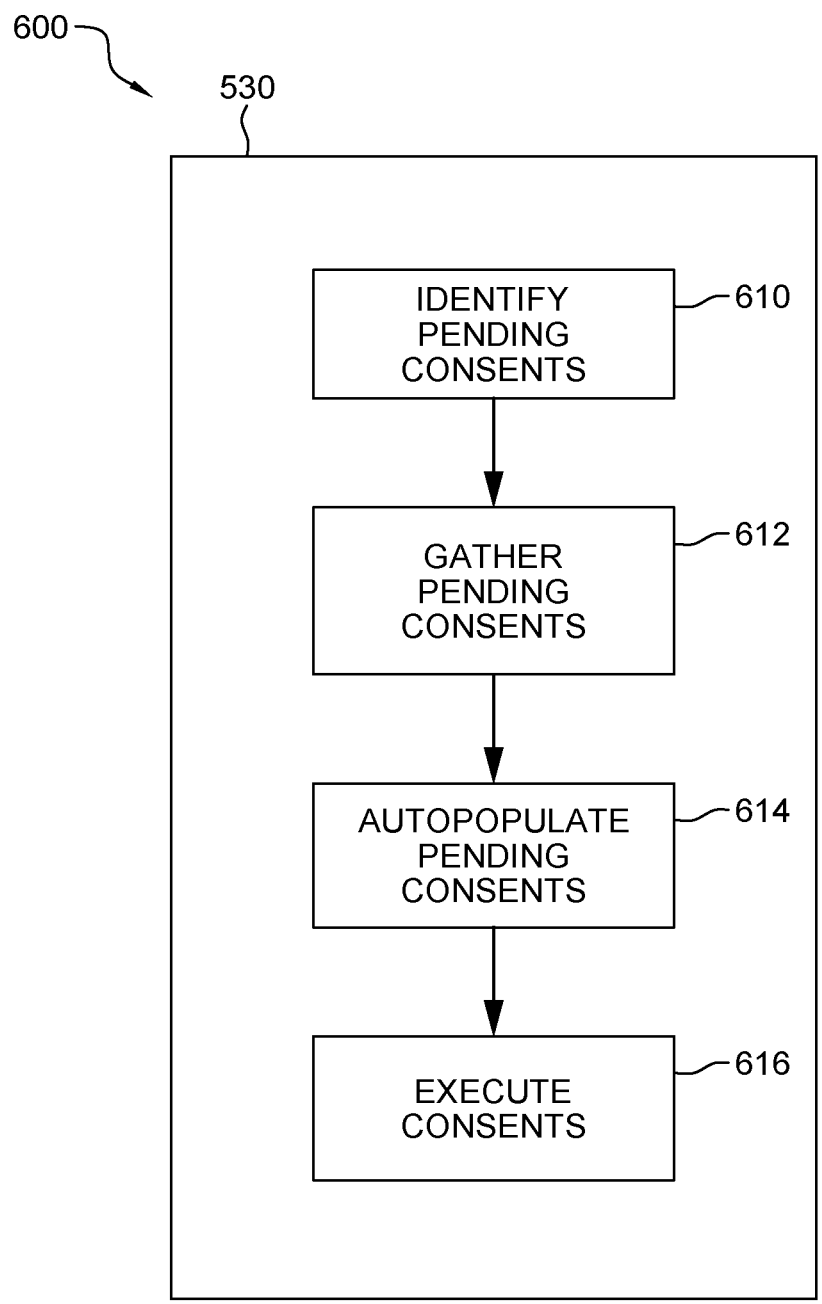
FIG. 6 illustrates a flowchart of processing pending consents for a rare user, according to an embodiment.

FIG. 6 illustrates a flowchart of a method 600 for processing pending consents for a rare user, according to an embodiment. As discussed above, the method 600 provides details of step 530 of FIG. 5. The method 600 provides a series of steps that aid the special member service representative in interacting with the rare user to manage pending consents. Starting at step 610, the method may identify pending consents. In some embodiments, the method 600 may retrieve identifying information for the rare user. The method 600 may use the identifying information to retrieve account and transaction information for the rare user. In some cases, the system may be in communication with an information repository, such as member and transaction data storage 938, which may provide information about member accounts and transactions.

Based on the retrieved account and transaction information, the method 600 may ascertain which consents are relevant to the user. The method 600 may then ascertain which consents (of any pending consents) have already been handled and which consents are still to be executed.

In step 612, the method may gather pending consents. The method 600 may perform a query that retrieves, from the appropriate data source or information repository, the consent documents that are determined as being associated with the rare user and are in need of consent. In some cases, the query may be based on a user's name, an alternative identifier associated with the user, or an account number associated with the user.

Some embodiments include provisions for a user with a single account. Some embodiments include provisions for a user with multiple accounts. The rare user may be associated with multiple accounts, only one of which may be relevant to the user being treated as a rare user. Thus, in some cases, embodiments may be able to discriminate between different types of accounts. In some embodiments, account types may include a bank account, an investment account, and a retirement account. In the various embodiments, the user may interact with the different accounts in different ways. In some embodiments, the user may use different types of access and have different frequency of interaction, based on the different types of account.

A user may have a bank account, an investment account, and a retirement account. The user may interact with the bank account frequently and may do so primarily using a mobile app. The user may interact with the investment account periodically, making them an uncommon user. When the user interacts with the investment account, the interaction may primarily occur using a website. Finally, when interacting with the retirement account, the user only interacts infrequently and primarily interacts by phone. Thus, it may be acceptable to handle the user's banking and investment goals without requiring that the user have special interactions with a representative. However, because the retirement account only involves infrequent interactions and the interactions are conducted over the phone, the user may be handled as a rare user for phone interactions.

Some embodiments may use different ways to determine a specific user account to manage and access. In some cases, these ways allow embodiments to determine which account is being accessed and how the account is classified. In some cases, an approach to handling such a situation may be to use different phone numbers for different types of account. Banking users may call one phone number, investment users may call another phone number, and retirement users may call a third phone number. In this manner, the system will know which type of transaction may be at issue based on which phone number receives the user call.

In some cases, an approach may be to use a single phone number for multiple accounts, but use an automated system, such as an Interactive Voice Response (IVR) system to guide the user to the correct type of account. The user could be automatically prompted to enter a digit that establishes the type of account the user wishes to use. In some cases, the user may enter the digit "1" if the user wishes to use a banking account, the digit "2" if the user wishes to use an investment account, or the digit "3" if the user wishes to use a retirement account, though alternative digits and types of accounts are possible. In some cases, the user may be prompted to enter an account number or other identifying number that clarifies which account they would like to use. In some cases, users may recite the type of account they would like to use, and automated recognition may indicate which type of account may be used.

Once the system is aware of which type of account the user may be using, in some embodiments the system may gather the corresponding pending consents 612 accordingly. Some embodiments may include provisions to identify a type of account, along with digital intensity and usage information. In some embodiments, the type of account, the digital intensity, and the usage information establish the consents relevant for a user. For a particular user, the system may establish that the user only signs onto an Individual Retirement Account (IRA) twice a year, and does so by phone. After establishing this, the system may proceed to identify that, since the user's last interaction with the system, the system gathers two privacy consents, a proxy vote document, and a prospectus document for the user. However, these are only examples, and other documents may be gathered for the user to consider and agree to in other examples. In some cases, the user may be matched with different accounts and different scores, and there may be more documents or different types of documents accordingly.

In step 614, the method 600 may autopopulate pending consents. Once the system has established which documents are designated for consent or execution by a user, the system may introduce whatever known information it has about the user or other information otherwise available into the consent documents. Such autopopulation may streamline the consent process. In some cases, the system may populate the agreement with identifying information for the user and the account, such as the user's name, the user's contact information (such as phone number, address, e-mail address, etc.), the user's account information, and so on. In some embodiments, the system may also introduce information about the particulars of the signature process, such as a date (and possibly a timestamp) associated with the signature, a location where the execution occurs, or may include information related to witnessing, where the witnessing may be performed by the representative or by another designated party or parties.

In step 616, the method 600 may execute pending consents. By executing consents, the method obtains a user's content to the terms of a given consent. A given consent may include multiple consent items. In some cases, the consent may include a privacy policy. Such a privacy policy may ask that users agree that they have read the policy and also agree to certain terms for sharing the personal information of the user. However, a privacy policy is only one type of consent, and some cases provide different types of consent for user approval.

Some embodiments may include provisions for obtaining user consent in a variety of ways. In some embodiments, the method obtains consents in ways that may involve fully automatic electronic consents. In some embodiments, the method may combine other methods of consent with electronic assistance. In some cases, the method may allow the user to electronically sign the consent document. Such an electronic signature may occur in a number of ways. In some embodiments, the user may use various input peripherals for entry of the electronic signature or consent. In some cases, the user may use a touchscreen, a stylus, a mouse, a keyboard, or another peripheral to aid in entering the electronic signature or consent. In some cases, the user may electronically sign a consent document by drawing a signature on a mobile device. However, other options exist for allowing the user to provide electronic consent. In some embodiments, the user may check a box, select a radio button, push a button, or use a combination of such controls on a mobile device to indicate consent. Additionally, in some embodiments, the user may use an encryption key to electronically sign the transaction, may use biometric consent such as fingerprint recognition. Alternatively, in other cases, the user may verbally agree to the consent, such as while being recorded during the voice call. Alternatively, in some embodiments a user signs a hardcopy of consents and may use a camera or a scanner to scan the physical document for uploading or fax transmission. In other cases, the user may mail a copy of executed consents.

With respect to consents, it may be noted that some agreements may be mandatory and others may be optional. Thus, for optional agreements the system may allow the user to opt out of consenting to the agreement. In some cases, the system may allow the user to opt out of postal notices, but this decision may be up to the user. In some cases, the system may offer the user an opportunity to use cookies during any website interactions, but the user may opt out of using such cookies. Also, the user may agree to some optional items without agreeing to other optional items, such as if the user agrees to tracking certain cookies but not others.

Figure 7:
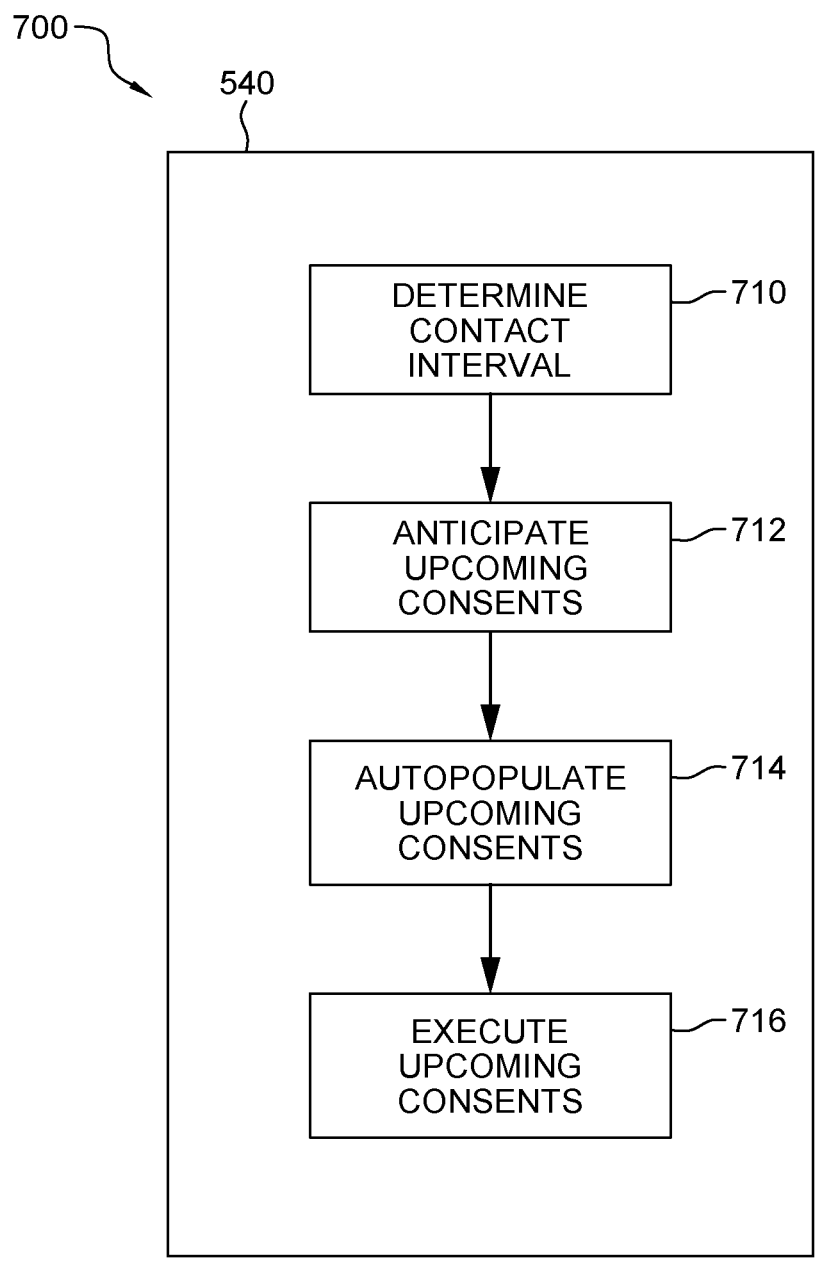
FIG. 7 illustrates a flowchart of processing upcoming consents for a rare user, according to an embodiment.

FIG. 7 illustrates a flowchart of a method 700 for processing upcoming consents for a rare user, according to an embodiment. The method 700 of FIG. 6 corresponds to step 540 of FIG. 5. Starting at step 710, the method 700 may determine a contact interval. Such a contact interval may refer to information about how rarely the rare user accesses the system. Some embodiments may include different approaches for determining the contact interval. For example, the rare user's last logon may have been one year ago. The system may infer that the contact interval may be one year. The system may then base the anticipation of upcoming consents on a contact interval of one year. Here, a history of a one year interval between interactions may indicate that a next interaction may be predicted to occur after one more year.

However, other approaches may also be used in other embodiments to establish the contact interval. Rather than basing the contact interval on only one previous contact, the contact interval may be based on two, three, or more previous contacts. These contacts may provide for an average contact interval, a maximum contact interval, and so on. Additionally, the raw contact data may be modified to generate the contact interval. If the last contact was one year ago, that interview may be doubled or halved to produce a contact interval of two years ago, respectively.

In step 712, the method 700 may anticipate upcoming consents. Previously, in step 710, the method 700 establishes a contact interval. Thus, anticipating upcoming consents may use the contact interval and may search for consents that are expected in the content interval. If the contact interval is six months, the method may search to find upcoming consents that will become available for consent and execution during the next six months. While step 712 may refer in particular to anticipating upcoming consents, step 712 may also include operations and transactions that may be upcoming in other ways. For example, if an insurance premium may be expected to be due during the contact interval, step 712 may allow the user to prepay an insurance premium. Alternatively, if a product or service may be planned to become available during the contact interval, step 712 may include offering a capability to pre-order the product or service whose availability occurs during the contact interval.

In step 714, the method 700 may autopopulate upcoming consents. For example, as discussed above, during step 712, upcoming consents may be anticipated for the user to execute. As in step 614, the method 700 may autopopulate upcoming consents in step 714. Again, such autopopulation may involve incorporating available information into the consents to facilitate approval and execution. Once the consents are autopopulated, the user information has been introduced into the consents and the consents are ready for user execution.

In step 716, the method 700 may execute upcoming consents. As noted above, some consents may be optional. Users may thus choose which consents to accept, accordingly. Thus, as in step 616, the user may indicate in a variety of ways that the user accepts the terms of the consent or agreement. However, in step 716, the consents being executed may be anticipated upcoming consents.

Figure 8:
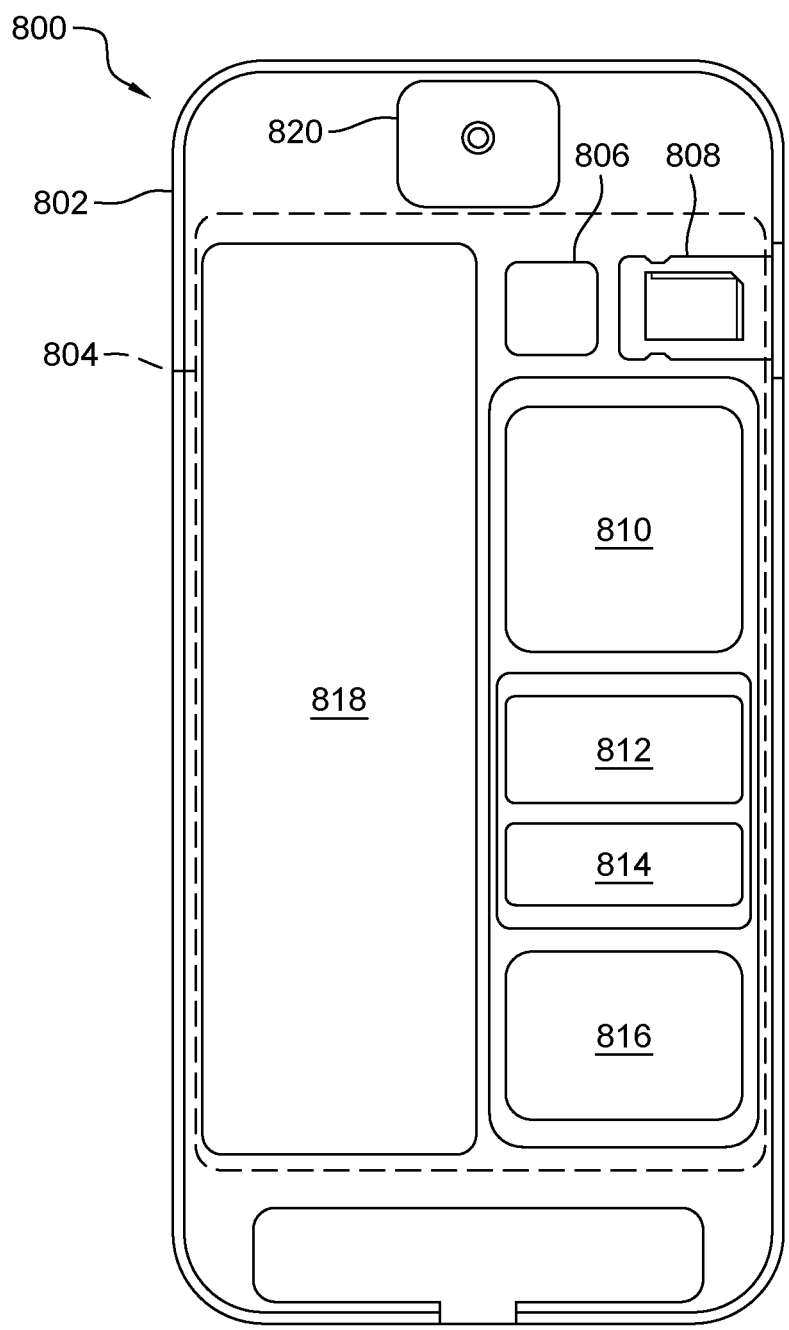
FIG. 8 illustrates a schematic view of a mobile device that may be used to interact with a digital intensity management system, according to an embodiment.

FIG. 8 illustrates a schematic view of a mobile device that may be used to interact with a digital intensity management system, according to an embodiment. FIG. 8 presents a schematic diagram 800 of a mobile device 802 by showing components that may be used in the digital intensity management system in an embodiment. For example, the mobile device 802 may be a smart phone that interacts with the digital intensity management system 910, as presented in further detail in FIG. 9. The mobile device 802 may allow the user to conduct a wholly digital interaction, or to carry out digital aspects of certain actions such as electronically signing consents while being assisted by a representative. The mobile device 802 is shown in FIG. 8 as taking the form of a smart phone. However, the mobile device 802 may be a similar electronic device providing for digital interaction by the user with the digital intensity management system 910, such as a tablet, a laptop computer, and so on.

The mobile device 802 may include a display 804. The display 804 may display information about an account to a user of the mobile device 802 to help the user of the mobile device 802 be guided through a financial transaction. The displayed information may also characterize the user's account information and include other relevant details about the user's account and associated transactions. The display 804 may also act as a user interface that a user of the mobile device 802 may use to interact electronically with their account. The display 804 may assist the user in managing their agreements and their consents. In some embodiments, the display 804 may be a touchscreen allowing a user to make choices and execute consent documents.

The mobile device 802 may additionally include a GPS unit 806. Data obtained from the GPS unit 806 allows the mobile device 802 to report its location to the digital intensity management system 910 or to onboard and network-based databases. Having access to the location of a user may be valuable in a number of ways. The mobile device 802 may report the location of a user to the digital intensity management system 910 to aid in handling a user's request. Such location information may be valuable with respect to properly handling a request made by the mobile device 802. The location may help confirm a user identity or a type of transaction that is likely to occur. The mobile device 802 may also include a subscriber identity module (SIM) 808. In some embodiments, the SIM 808 may serve to associate the mobile device 802 with the user and the user's accounts. By so doing, the SIM 808 may provide a security feature. Unless the identity of the user as recorded on the SIM 808 properly corresponds to the account that the user attempts to access, the user may be blocked as using an unauthorized device.

The mobile device 802 may also include a processing unit 810 that acts as a control module for the components of the mobile device 802, including the display 804 and the camera 820. The camera 820 may be of use in obtaining images for biometric recognition such as facial recognition. The camera 820 may also be of use in capturing images of executed documents. In some embodiments, the mobile device 802 includes some of the functional elements of the digital intensity management system 910 itself, such that the processing unit 810 processes user interaction data otherwise performed by the digital intensity management system 910. In other embodiments, the processing unit 810 merely acts a control module for managing user interactions present on the mobile device 802 itself.

In other embodiments, the digital intensity management system 910 may be remote to the mobile device 802. The mobile device 802 may display account information and consent documents received from the digital intensity management system 910. In such embodiments, the processing unit 810 in the mobile device 802 may receive communications from the digital intensity management system 910. Accordingly, the mobile device 802 may be notified whenever an interaction between the user of the mobile device 802 and the digital intensity management system 910 occurs. In some cases, such interactions may involve routine account management interactions, or specialized account interactions based on the user being a rare user, such as facilitated consents. Alternatively, the interactions may involve other interactions designed to increase a user's digital intensity. Such interactions may be designed to make a mobile app-based interaction or a website-based interaction more appealing.

The mobile device 802 may also include a connection module 816. The connection module 816 may be associated with wired connections to the mobile device 802. For example, the wired connections may be used for charging the mobile device 802 or for making a wired connection between the mobile device 802 and another device. In some embodiments, the connection module 816 serves as a communications path for updating firmware or uploading user data and transaction data into a member and transaction module installed on mobile device 802.

The mobile device 802 may further include a memory 814. In some embodiments, the memory 814 may store images of financial documents generated by the camera 820 before the images are processed by the digital intensity management system 910. In some embodiments, the memory 814 may also serve as local storage for user information, consents and forms. In some cases, locally stored user information includes images of signed consents and forms that are executed by users associated with the mobile device 802, taken when the users have executed the forms.

Figure 9:
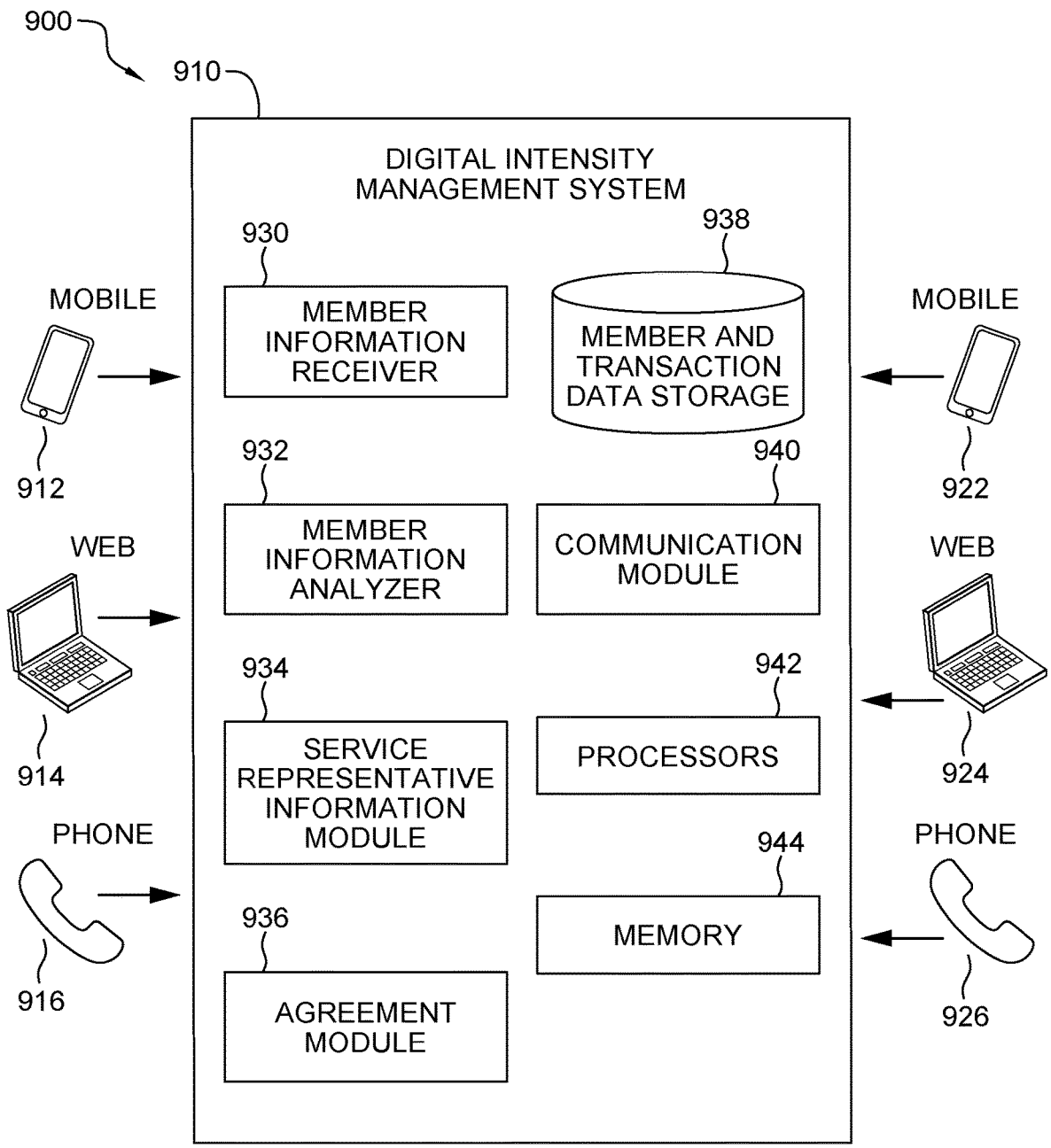
FIG. 9 illustrates a schematic view of a digital intensity management system, according to an embodiment.

The mobile device 802 may also include a communication module 812. The communication module 812 may be associated with wireless communications (such as WiFi, Bluetooth, near field communication (NFC) technologies, and 3G, 4G, or 5G for transmissions over the Internet) and other devices, servers, and databases either local to the mobile device 802 or remote to the mobile device 802. For example, the communication module 812 may facilitate wireless communication between the mobile device 802 and the member and transaction data storage 938 of the digital intensity management system 910. In some embodiments, the communication module 812 thus allows the mobile device 802 to wirelessly send and receive information so that a user can interact with the mobile device 802 as shown in FIG. 9. Such interaction may be tailored to the special assistance given to a rare user. The mobile device 802 may also include a battery 818 and the camera 820. The battery 818 provides the power source for the mobile device 802. In some embodiments, as noted above, the camera 820 takes images for biometric security verification and for taking pictures of executed documents.

FIG. 9 illustrates a schematic view 900 of a digital intensity management system 910, according to an embodiment. The schematic view 900 includes digital intensity management system 910. Digital intensity management system 910 may receive contacts from mobile devices using a mobile app, such as from mobile devices 912 and 922. Such mobile devices 912 and 922 may be smart phones using a mobile app. Mobile devices 912 and 922 may also each be another mobile device such as a portable music player or a tablet that runs a mobile operating system and has the capability to run mobile apps.

Additionally, digital intensity management system 910 may receive contacts from Web devices 914 and 924, such as through a browser. FIG. 9 shows Web devices 914 and 924 as each being a laptop computer running a browser. Web browser access may also occur through a desktop computer or through another device such as a smart phone or a tablet that runs a Web browser. A device such as a smart phone or a tablet may interact with digital intensity management system 910 either by running a dedicated mobile app, in which case it corresponds to mobile devices 912 and 922, or alternatively may interact with digital intensity management system 910 by using a Web browser, in which case it corresponds to Web devices 914 and 924.

However, whether an electronic device interacts with digital intensity management system 910 by using a dedicated mobile application or by using a Web browser, the interaction may be considered to be a digital interaction. In a digital interaction, the user may be provided by access with the services they would like to access by providing a user interface that allows the user to conduct any appropriate transactions.

Some embodiments may include provisions to allow interaction using an online chat capability, during a digital interaction. Such an online chat capability may involve interaction with an online agent. Here, the online agent may be a human being or may be a chatbot. While a human being may be better at understanding how to effectively serve a user's goals, a chatbot that has Natural Language Processing (NLP) capabilities as well as appropriate training may be flexible enough to handle many basic questions for users in a digital interaction without requiring a human being. In some embodiments, the user may initially interact with a chatbot. In some embodiments, the chatbot may suffice. In some cases, if the chatbot is unable to adequately address the user's goals, the chatbot may involve a human member service representative to take over and better serve the user's goals.

Alternatively, the user may interact with a member service representative over the phone or otherwise through a voice call. Such phone or voice interaction may use a corded phone, a cordless phone, a pay phone, a feature phone, a cellular phone, a smart phone, and so on. As discussed further above, these devices may allow for a voice call over various communication networks. Alternatively, phone interaction may occur through Voice Over Internet Protocol (VOIP) or through a chatting or teleconference app that facilitates audio interaction.

The digital intensity management system 910 may include a number of components that support its functionality. For example, digital intensity management system 910 may include a member information receiver 930, a member information analyzer 932, a service representative information module 934, an agreement module 936, a member and transaction information data storage 938, a communication module 940, one or more processors 942, and a memory 944. However, these are only example components, and in other embodiments, the digital intensity management system 910 may include other components or may combine or omit some of these elements.

The digital intensity management system 910 may include any kind of computing device, such as a desktop computer, a laptop computer, a tablet computer, a smart phone, or any other suitable computing device. The digital intensity management system 910 may also include multiple computers or be hosted and implemented using cloud computing resources. In some embodiments, the digital intensity management system 910 may include one or more processors 942 and memory 944 suitable to store instructions that can be executed by processors 942.

The member information receiver 930 may gather information that can be used to assess members' digital intensity. The member information receiver 930 may also assist in serving the members once their digital intensity is established. As described above, the member information receiver 930 may receive and track interactions. Additional interaction information may be tracked and stored in an information repository, such as member and transaction data storage 938. In some cases, the member information receiver 930 may receive information about users who transact over a mobile application, such as users of mobile devices 912 and 922, users of Web devices 914 and 924, and users of phones 916 and 926.

As the member information receiver 930 acquires the transaction information, it may also acquire and store metadata along with the transactions. Some embodiments may include provisions for storing and using various types of metadata. Such metadata may be metadata that aids in the processing of the metadata to characterize usage patterns of users of the system. In some cases, there may be metadata that applies to all transactions. In some cases, there may be metadata that only applies to particular types of transactions.

In some embodiments, each transaction may be associated with information about timing of the transaction. In some cases, each transaction may be associated with timestamps for the beginning and end of the transaction. In some cases, each transaction may also be associated with duration information, where the duration information may pertain to a duration of the entire transaction, as well as durations of pertinent sub-portions of the transaction. In some cases, it may be helpful to track, for each transaction, time periods during which the member may be waiting to be served or time periods during which the member may be interacting with a member service representative.

In some embodiments, there may also be metadata pertaining to a location associated with each transaction. In some cases, the location metadata may be associated with a geographical location (such as latitude and longitude, or a street address). The location metadata may also be associated with a type of location. In some cases, the metadata may indicate whether the transaction originates from a home, an office, a commercial establishment, or so on. Having such metadata may be helpful in establishing whether a transaction pertains to a personal transaction or a business transaction, which may be helpful when determining how to handle the transaction effectively.

In some embodiments, there may also be metadata related to the user who conducts a given transaction. In some cases, the user metadata may include identifying information for the user, such as a user's full name, any aliases used by the user, and identification information. In some embodiments, the identifying information may include at least one of a Social Security Number, a driver's license number, a Tax ID, a bank account number, an insurance policy number, and so on. The identifying information may be linked to accounts for the user provided by the provider.

In some embodiments, there may also be metadata pertaining to particular types of ways in which a member conducts an access session. In some cases, mobile transactions may be associated with a particular type of mobile device or mobile operating system. In some cases, Web transactions may be associated with an Internet Protocol (IP) or other Internet address from which the transactions originate, or with a browser from which the transactions originate. For example, Web transactions may be associated with metadata about a particular browser used for the transactions, or whether a full website or a simplified website may be used for the transactions. In some embodiments, there may also be metadata stored for a phone transaction. In some cases, the metadata may include a type of phone (wired, wireless, cellular, smart phone, VoIP phone, etc.) and a type of network associated with the voice call. In some embodiments, the metadata may also include a phone number or Internet address associated with the voice call.

The member information analyzer 932 may receive the usage information about member activity as acquired from the member information receiver 930. For example, the member information analyzer 932 may receive information about transactions between members and the digital intensity management system 910. By acquiring the transaction information, the member information analyzer 932 may be able to process the transaction information as shown in FIGS. 2A-2D to make personalized digital intensity calculations and then use these personalized digital intensity calculations to help users appropriately. For example, as shown and discussed in detail in FIGS. 2A-2D, the member information analyzer 932 may perform session contact extraction 202, transformation and characterization 204, obtain a distinct member view 206, summarize to a rolling 12-month perspective 208, and perform a digital intensity calculation 210. The member information analyzer 932 may repeat the steps, as appropriate.

The service representative information module 934 may provide functionality for assisting a member service representative in serving a rare user. As discussed above, such rare users may be provided with special service and attention when they conduct transactions. Thus, service representative information module 934 may provide the features above with respect to providing a special representative. Such features may include managing call order and providing user information to the representative as discussed further above to aid in serving the rare user.

The agreement module 936 may provide for functionality as shown in FIGS. 6 and 7. For example, the agreement module 936 may provide the ability to handle pending agreements, as well as future agreements. For example, with respect to pending agreements, the agreement module 936 may identify pending consents 610, gather pending consents 612, autopopulate pending consents 614, and execute the consents 616. Additional discussion of these steps is provided, above, in conjunction with FIG. 6. Moreover, the agreement module 936 may provide the ability to handle future agreements. For example, with respect to future agreements, the agreement module 936 may determine a contact interval 710, anticipate upcoming consents 712, autopopulate upcoming consents 714, and execute the upcoming consents 716.

The member and transaction information data storage 938 stores information related to members and related to transaction. Some embodiments may include provisions for storing such information in various ways. In some cases, the member and transaction information storage may store information in markup documents, a spreadsheet, or a database or data repository. In some cases, the member and transaction information data storage 938 may be a relational database. In some cases, the member and transaction information data storage 938 may be a hierarchical database, a network database, or an object-oriented database. The member and transaction information data storage 938 is shown as a local information repository for the digital intensity management system 910. However, in some embodiments the member and transaction information data storage 938 may also be a remote database, or another form of equivalent cloud storage.

As discussed above, the member and transaction information data storage 938 may store member information. Such member information may include identifying information and related account information for the members. The member and transaction database may also include transaction records. As noted above, such transaction records may include a record of each transaction (regardless of channel), an indication of the channel used to carry out each transaction, and additional metadata that may help the digital intensity management system 910 to effectively analyze transactions and better serve users.

The communication module 940 may provide functionality that allows the digital intensity management system 910 to communicate with external resources. In some embodiments, the communication module 940 may provide for network connectivity to member and transaction information data storage 938 if this information repository is hosted remotely or over the cloud. Additionally, in some cases, the communication module 940 may communicate with user devices, such as users of mobile devices 912 and 922, users of Web devices 914 and 924, and users of telephones 916 and 926. Some of the transactions managed by communication module 940 may be digital transactions, while others may be non-digital transactions, such as telephone transactions.

The processors 942 may include one or more central processing units (CPUs) and/or graphics processing units (GPUs), as discussed below. The processors may execute instructions to cause embodiments to provide the functions discussed above. The memory 944 may store the instructions executed by the processor. The memory 944 may include read only memory (ROM) and/or random access memory (RAM). Thus, overall, the memory 944 includes instructions for carrying out steps as shown in the various drawings. While FIG. 9 shows processors 942 and memory 944 as being local resources for the digital intensity management system, it may also be possible for embodiments to use processors 942 and memory 944 provided as resources accessed over the cloud or accessed remotely at a server or over a peer-to-peer network.

The embodiments may provide several advantageous features. The embodiments may gather, organize, and analyze transaction data for users in a manner that provides a way to calculate a more useful, precise, and personalized digital intensity metric. Such a metric may accurately represent how often an individual user interacts with a business system using digital channels. It may also be possible to aggregate the digital intensity information to develop effective business strategies. By combining such a metric with other information about user access, it may be possible to identify which users are good candidates for increasing digital intensity.

Some users may be determined to be rare users, who only use the system infrequently and often through non-digital channels. Such rare users may be served by a special representative more quickly to increase the chance that the rare users will complete the call. Once the rare users are matched with a special representative, the special representative may have access to additional information to better serve the rare user. For example, the special representative may help guide the rare user through executing pending and anticipated consents, thereby maximizing the value of a rare encounter. The special representative may also encourage the rare user to use digital channels more frequently and access the system more frequently.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable Internet access, satellite broadband, wireless ISP, fiber optic Internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or re-ordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of call routing based on measuring and applying a digital intensity metric, comprising:
   receiving a voice call from a calling user;
   accessing user transaction information for a plurality of users including the calling user;
   processing the user transaction information to produce summarized transaction information for the calling user;
   calculating a digital intensity metric for the calling user based on the summarized transaction information by calculating a quotient of exclusively digital opportunities and total opportunities;
   classifying the calling user as a rare user based on the digital intensity metric;
   routing the calling user to a special member service representative;
   providing user account information for the calling user to the special member service representative;
   providing consent documents to the calling user for execution;
   receiving the executed consent documents from the calling user; and
   wherein the accessing the user transaction information accesses mobile app transaction information, website transaction information, and telephone transaction information for each user of the plurality of users.

2. The method of claim 1, wherein the user transaction information includes the number of previous transactions conducted by the calling user.

3. The method of claim 1, wherein the processing the transaction information comprises:
   extracting session contact information from the user transaction information;
   transforming and characterizing the session contact information;
   determining a member view for the transformed and characterized session contact transaction information; and
   summarizing the member view to a rolling twelve-month perspective.

4. The method of claim 1, wherein the classifying the calling user is also based on a transaction frequency of the calling user.

5. The method of claim 1, further comprising modifying a call queue based on the classifying of the calling user.

6. The method of claim 1, wherein the consent documents include pending consents and upcoming consents.

7. The method of claim 6, wherein the consent documents are autopopulated prior to execution.

8. A method of call routing based on measuring and applying a digital intensity metric, comprising:
   receiving a voice call from a calling user;
   accessing user transaction information for a plurality of users including the calling user;
   processing the user transaction information to produce summarized transaction information for the calling user;
   calculating a digital intensity metric for the calling user based on the summarized transaction information;
   classifying the calling user as a rare user based on the digital intensity metric;
   routing the calling user to a special member service representative;
   providing user account information for the calling user to the special member service representative;
   providing consent documents including pending and upcoming consent documents to the calling user for execution;
   receiving the executed consent documents from the calling user; and
   the step of calculating the digital intensity comprises calculating a quotient of exclusively digital opportunities and total opportunities and wherein the exclusively digital opportunities are opportunities including mobile app transactions and website transactions.

9. The method of claim 8, further comprising determining a contact interval based on transaction history for the calling user, wherein the upcoming consents fall within the contact interval.

10. The method of claim 8, wherein the executed consent documents are executed using an electronic signature.

11. The method of claim 8, wherein the user transaction information includes the number of previous transactions conducted by the calling user.

12. The method of claim 8, wherein the executed consent documents are executed by signing a physical copy of the consent documents, taking a digital image of the physical copy, and providing the digital image to the system.

13. The method of claim 8, wherein the calling user makes the voice call using a smart phone.

14. The method of claim 8, wherein the user account information provided to the special member service representative includes the digital intensity metric.

15. A system for call routing based on measuring and applying a digital intensity metric, comprising:
a processor; and
a non-transitory computer readable medium storing instructions that are executable by the processor to:
receive a voice call from a calling user;
access user transaction information for a plurality of users including the calling user;
process the user transaction information to produce summarized transaction information for the calling user;
calculate a digital intensity metric for the calling user based on the summarized transaction information;
classify the calling user as a rare user based on the digital intensity metric;
modify a call queue based on the user classification;
route the calling user to a special member service representative;
provide user account information for the calling user to the special member service representative;
provide consent documents to the calling user for execution; and
receive the executed consent documents from the calling user; and
calculate the digital intensity by calculating a quotient of exclusively digital opportunities and total opportunities and wherein the exclusively digital opportunities are opportunities including mobile app transactions and website transactions.

16. The system of claim 15, wherein the processor is configured to process the transaction information by:
extracting session contact information from the user transaction information;
transforming and characterizing the session contact information;
determining a member view for the transformed and characterized session contact transaction information; and
summarizing the member view to a rolling twelve-month perspective.

17. The system of claim 15, wherein the processor is configured to normalize the obtained transaction information during the session contact extraction.

18. The system of claim 15, wherein the transformation and characterization includes grouping and characterizing.

19. The system of claim 15, wherein the transaction information captures mobile app transaction information, website transaction information, and telephone transaction information for each user.

20. The system of claim 15, wherein the digital intensity metric is a numerical score, and the classifying that the calling user as a rare user is based on the digital intensity metric exceeding a threshold score.

* * * * *